US009547877B2

United States Patent
Chung et al.

(10) Patent No.: US 9,547,877 B2
(45) Date of Patent: Jan. 17, 2017

(54) IDENTIFICATION OF A TRIGGER-TYPE LEADER IN A SOCIAL NETWORK

(71) Applicant: LinkedIn Corporation, Mountain View, CA (US)

(72) Inventors: Christina Yip Chung, Mountain View, CA (US); Allen Blue, Sunnyvale, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 342 days.

(21) Appl. No.: 14/298,793

(22) Filed: Jun. 6, 2014

(65) Prior Publication Data

US 2015/0100539 A1    Apr. 9, 2015

Related U.S. Application Data

(60) Provisional application No. 61/886,284, filed on Oct. 3, 2013, provisional application No. 61/986,795, filed on Apr. 30, 2014.

(51) Int. Cl.
| | |
|---|---|
| *G06F 9/44* | (2006.01) |
| *G06N 7/02* | (2006.01) |
| *G06N 7/06* | (2006.01) |
| *G06Q 50/00* | (2012.01) |
| *G06Q 10/10* | (2012.01) |

(52) U.S. Cl.
CPC .......... *G06Q 50/01* (2013.01); *G06Q 10/1053* (2013.01)

(58) Field of Classification Search
CPC combination set(s) only.
See application file for complete search history.

(56) References Cited

U.S. PATENT DOCUMENTS 7,809,740 B2 * 10/2010 Chung ................... G06Q 30/02
707/758
7,904,448 B2 *  3/2011 Chung ................... G06Q 30/02
707/721

(Continued)

OTHER PUBLICATIONS

Location-based correlation estimation in social network via Collaborative Learning Xiao-Yu Zhang; Kai Zhang; Xiaochun Yun; Shupeng Wang; Xiuguo Bao; Qingsheng Yuan 2016 IEEE Conference on Computer Communications Workshops (INFOCOM WKSHPS) Year: 2016 pp. 1073-1074, DOI: 10.1109/INFCOMW.2016.7562259 IEEE Conference Publicati.*

(Continued)

*Primary Examiner* — Michael B Holmes
(74) *Attorney, Agent, or Firm* — Schwegman Lundberg & Woessner, P.A.

(57) ABSTRACT

Techniques for identification of a trigger-type leader in a social network are described. According to various embodiments, a specific content item posted by a particular actor of a plurality of actors and interactions by other actors of the plurality of actors with the specific content item are identified. A leadership score associated with the particular actor is then calculated, the leadership score indicating a propensity of the particular actor to stimulate discussion among actors of the online social network service. The particular actor is then classified as an information trigger among the plurality of actors of the online social network service, based on the calculated leadership score.

18 Claims, 15 Drawing Sheets

(56) References Cited

U.S. PATENT DOCUMENTS

| | | | | |
|---|---|---|---|---|
| 8,010,460 B2* | 8/2011 | Work | ................... | G06Q 10/00 |
| | | | | 705/319 |
| 8,200,587 B2 | 6/2012 | Deyo | | |
| 8,271,516 B2 | 9/2012 | Gounares et al. | | |
| 8,359,328 B2 | 1/2013 | Hom et al. | | |
| 8,380,804 B2* | 2/2013 | Jain | ................... | G06Q 10/109 |
| | | | | 709/207 |
| 8,438,170 B2* | 5/2013 | Koran | ................... | G06Q 30/02 |
| | | | | 707/748 |
| 8,504,559 B1* | 8/2013 | Elman | ................... | G06Q 30/08 |
| | | | | 705/321 |
| 8,504,575 B2* | 8/2013 | Koran | ................... | G06Q 30/02 |
| | | | | 707/748 |
| 8,566,252 B2 | 10/2013 | Harding | | |
| 8,589,332 B2 | 11/2013 | Brooks et al. | | |
| 8,606,743 B2 | 12/2013 | Li et al. | | |
| 8,713,000 B1* | 4/2014 | Elman | ................... | G06Q 30/08 |
| | | | | 705/321 |
| 9,002,956 B1 | 4/2015 | Karam | | |
| 9,105,048 B2* | 8/2015 | Koran | ................... | G06Q 30/02 |
| 9,172,762 B2* | 10/2015 | Ruffner | ............ | G06F 17/30873 |
| 9,225,676 B1 | 12/2015 | Shoham et al. | | |
| 9,229,900 B2* | 1/2016 | Blue | ................ | G06F 17/30867 |
| 9,247,015 B2* | 1/2016 | Ruffner | ............ | G06F 17/30873 |
| 9,286,569 B2* | 3/2016 | Koran | ................... | G06Q 30/02 |
| 9,298,900 B2* | 3/2016 | Davis | ................... | G06F 21/316 |
| 9,336,333 B2* | 5/2016 | Blue | ................ | G06F 17/30864 |
| 9,378,287 B2 | 6/2016 | Frey | | |
| 2007/0180078 A1 | 8/2007 | Murphy et al. | | |
| 2010/0169148 A1 | 7/2010 | Oberhofer et al. | | |
| 2012/0158476 A1 | 6/2012 | Neystadt et al. | | |
| 2013/0346501 A1 | 12/2013 | Hardas et al. | | |
| 2014/0082072 A1 | 3/2014 | Kass et al. | | |
| 2014/0172975 A1 | 6/2014 | Smith | | |
| 2014/0297746 A1 | 10/2014 | Cheng et al. | | |
| 2015/0100522 A1 | 4/2015 | Chung et al. | | |
| 2015/0100538 A1 | 4/2015 | Chung et al. | | |
| 2015/0100683 A1 | 4/2015 | Chung et al. | | |

OTHER PUBLICATIONS

Fast Social Service Network Construction Using Map-Reduce for Efficient Service Discovery Yutaka Koshiba; Incheon Paik; Wuhui Chen 2016 IEEE International Conference on Services Computing (SCC) Year: 2016 pp. 371-378, DOI: 10.1109/SCC.2016.55 IEEE Conference Publications.*

Strong Social Component-Aware Trust Sub-network Extraction in Contextual Social Networks Guanfeng Liu; Yan Wang; Mehmet A. Orgun; Xiaoming Zheng; An Liu; Zhixu Li; Kai Zheng 2016 IEEE International Conference on Web Services (ICWS) Year: 2016 pp. 107-114, DOI: 10.1109/ICWS.2016.22 IEEE Conference Publications.*

SocialMix: Supporting Privacy-Aware Trusted Social Networking Services Chao Li; Balaji Palanisamy; James Joshi 2016 IEEE International Conference on Web Services (ICWS) Year: 2016 pp. 115-122, DOI: 10.1109/ICWS.2016.23 IEEE Conference Publications.*

"U.S. Appl. No. 14/298,758, Non Final Office Action mailed Feb. 2, 2016", 17 pgs.

"U.S. Appl. No. 14/298,758, Final Office Action mailed Aug. 12, 2016", 16 pgs.

"U.S. Appl. No. 14/298,758, Response filed Apr. 27, 2016 to Non Final Office Action mailed Feb. 2, 2016", 11 pgs.

"U.S. Appl. No. 14/298,777, Non Final Office Action mailed Jul. 20, 2016", 63 pgs.

"U.S. Appl. No. 14/298,802, Non Final Office Action mailed Jul. 26, 2016", 21 pgs.

"U.S. Appl. No. 14/298,802, Response filed Sep. 26, 2016 to Non Final Office Action mailed Jul. 26, 2016", 9 pgs.

* cited by examiner

| SOCIAL CAPITAL | LEADERSHIP TYPE | | | |
|---|---|---|---|---|
| | Authority Characteristics: Possess the social capital, or high influence of a network w.r.t. the social capital  Identification: Reputation | Trigger Characteristics: Stimulate / seed activities of network members w.r.t. the social capital  Identification: Reputation | Propagator Characteristics: Source, spread (amplify reach of) social capital within a network  Identification: Reputation, Network Topology (reach, sub-network density) | Broker Characteristics: Bridge connecting two sub-networks re: social capital  Identification: Network Topology (connectedness) |
| Information | e.g., expert (topical, global) | e.g., stimulate & seed conversations with thought provoking opinions (also known as Provocateur) | e.g., Actors with high network reach (such as Group Moderator) who curate good quality information (also known as Broadcaster) | e.g., Evelyn in the example diagram -- my window to info on Enterprise Big Data |
| Relationship | e.g., actors of high socio-economic status in a network e.g., CXO e.g., celebrities in a profession | e.g., networker / hub who brings other actors together | e.g., Recruiters source talents for companies | e.g., a connection to Oracle – a company I have very few connections |
| Resources (job, money, visibility) | e.g., hiring manager (job) e.g., investor (money) e.g., journalist who covers a story of a person (media visibility) | e.g., University stimulates job activities with job fair events (job) e.g., US Government stimulates investments in green tech industry (investment) e.g., Marketer stimulates community discussion of a new product (visibility) | e.g., LinkedIn spreads job opportunities to the community by jobs platform e.g., venture capitalist spreads money to entrepreneurs e.g., media channel spreads the media coverage of a person to the community (visibility) | e.g., a connection which leads to resources whom I would otherwise not able to get access to |

*Fig. 9*

IDENTIFICATION OF A TRIGGER-TYPE LEADER IN A SOCIAL NETWORK

CROSS-REFERENCE TO RELATED APPLICATIONS

This application claims the priority benefit of U.S. Provisional Application No. 61/886,284, filed Oct. 3, 2013 and U.S. Provisional Application No. 61/986,795, filed Apr. 30, 2014, each of which is incorporated by reference herein in its entirety.

TECHNICAL FIELD

The present application relates generally to data processing systems and, in one specific example, to techniques for identification of a trigger-type leader in a social network.

BACKGROUND

Online social network services (such as the "LinkedIn" social network) feature a large number of members that can interact with various products and content items associated with the online social network service. For example, members of the LinkedIn social network have profile pages describing information about themselves, and these members can interact with content posted in a content feed (such as the "Network Update Stream") of the online social network service, or they can interact with profile pages of other members and entities of the online social network service, such as groups, companies, universities, and so on.

BRIEF DESCRIPTION OF THE DRAWINGS

Some embodiments are illustrated by way of example and not limitation in the figures of the accompanying drawings in which:

FIG. 9 illustrates a table summarizing various information about different types of leaders, according to various embodiments;

DETAILED DESCRIPTION

Example methods and systems for identification of a trigger-type leader in a social network are described. In the following description, for purposes of explanation, numerous specific details are set forth in order to provide a thorough understanding of example embodiments. It will be evident, however, to one skilled in the art that the present invention may be practiced without these specific details.

Figure 1:
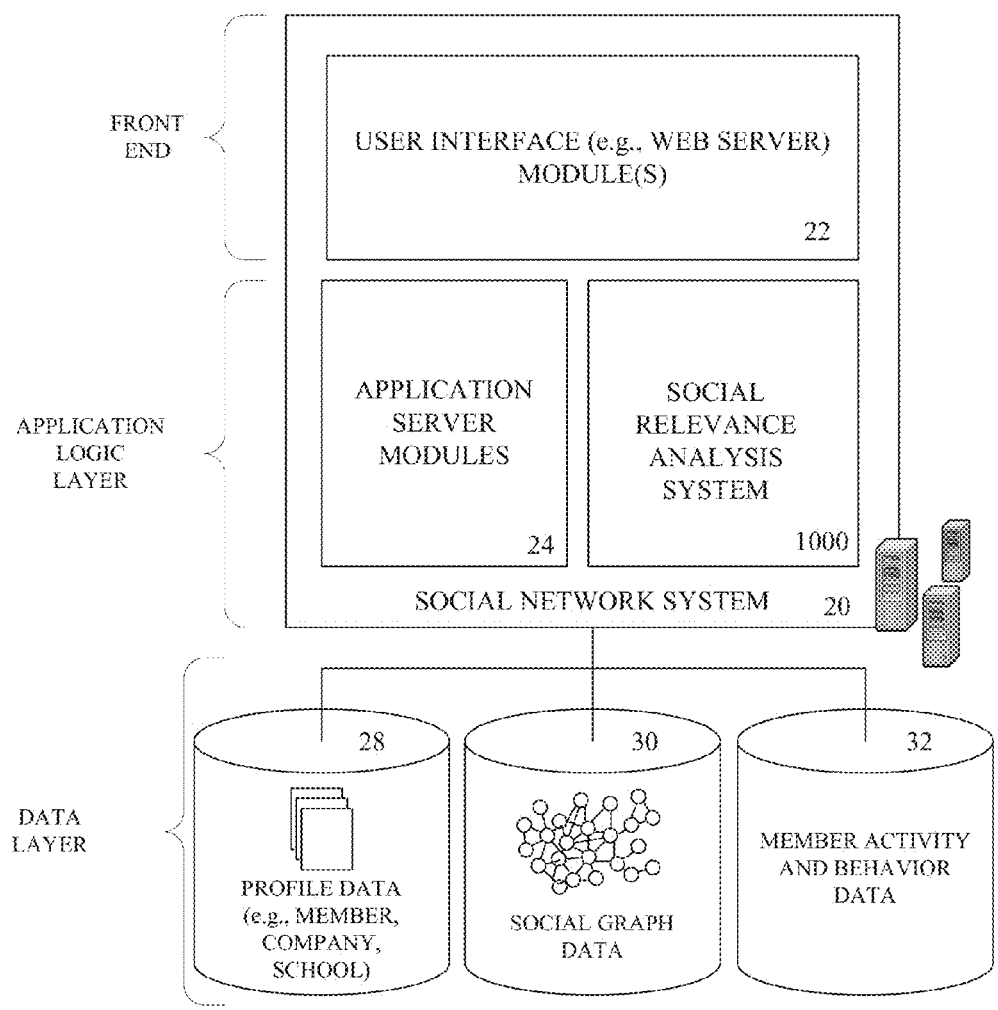
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, hometown, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

With some embodiments, the social network system 20 includes what is generally referred to herein as a social relevance analysis system 1000. The social relevance analysis system 1000 is described in more detail below in conjunction with FIG. 10.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system. The operation of the social relevance analysis system 1000 will be described in more detail below, in connection with various embodiments.

1. Sociographs:

According to various example embodiments described herein, the social relevance analysis system 1000 (hereinafter "the system 1000") may be configured to generate and/or access a sociograph associated with one or more online social networks. A sociograph is a graphical structure with nodes and edges, wherein the nodes represent actors and the edges between the nodes represent relationships between the corresponding actors.

Various conventional online social networks such as Facebook® may be associated with simplified friend graphs or connection graphs. However, such graphs merely represent one type of basic relationship between different members of the online social network. For example, a Facebook® friend graph merely represents how users are connected to each other through friendship relationships only.

In contrast, according to various example embodiments described herein, sociographs may be annotated by the system 1000 with rich and deep information that describes all possible relationships between actors. That is, the system 1000 enables a sociograph to become a generalization of all possible relationships between actors that are formed into a graphical structure. Accordingly, the sociographs described herein are far more complex, intricate, and nuanced than simple friendship graphs or connection graphs that represent basic relationship between different users.

As described in more detail below, by leveraging all available information with respect to an online social network (e.g., profile information of members of the social network, people's group memberships on the social network, social activity signals with respect to the social network, and so on), the system 1000 is able to generate extremely rich annotations for the edges between actors.

Figure 2:
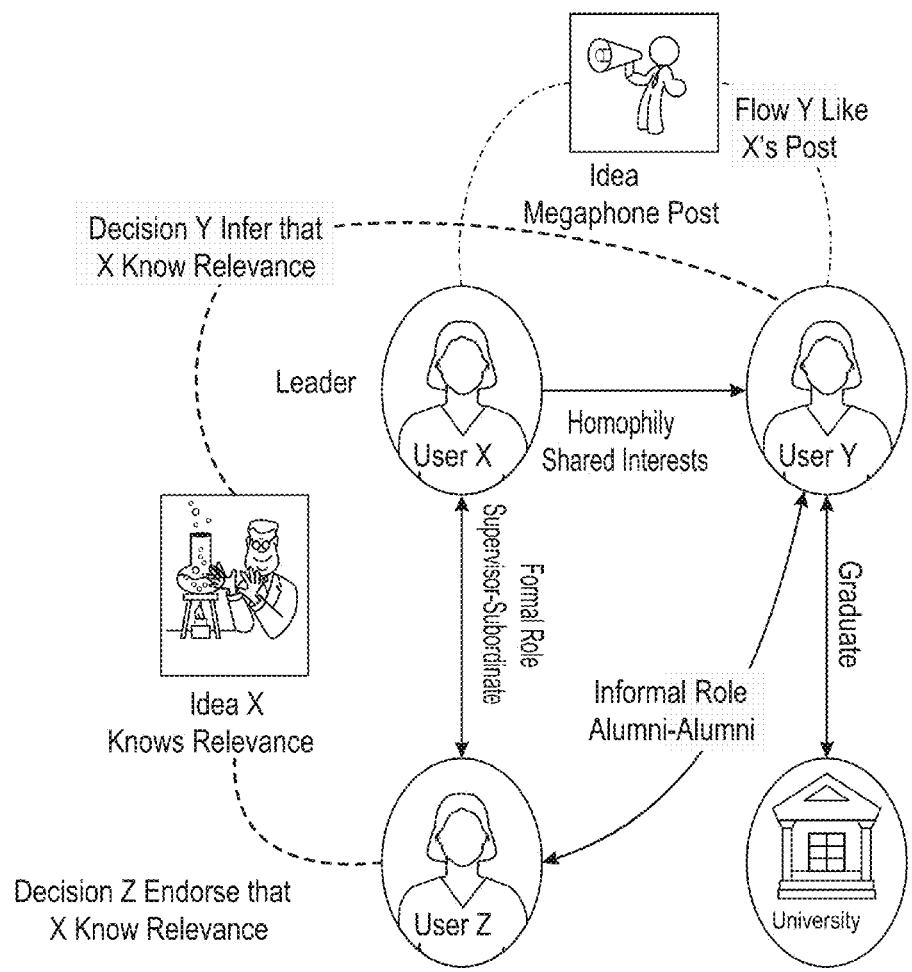
FIG. 2 illustrates an example sociograph, according to various embodiments.

1.1. Actors:

As described above, nodes in a sociograph may represent actors. In some embodiments, the actors may correspond to either members or entities. A member may be a member of an online social network service such as LinkedIn®, Facebook®, Twitter®, etc. In some embodiments, a member may correspond to influencers on the LinkedIn® online social network service. An entity may be a company, business, enterprise, institute, school, university, organization, group, publication, Journal, club, or other entity. In some embodiments, the entities may be content producing entities (e.g., a group on a social network service such as LinkedIn, a university, etc.). FIG. 2 illustrates an example of a sociograph that identifies various actors, such as user X, user Y, user Z, and University.

1.2. Relationships Between Actors:

As described above, nodes in the sociograph may represent actors, and edges between the nodes in the sociograph may represent the relationships between the actors. For example, with reference to the example sociograph illustrated in FIG. 2, the sociograph includes edges extended between the nodes representing user X, user Y, user Z, and University, which represent the relationships between these actors. As described in more detail below, in some embodiments, a relationship may correspond to a connection, a role, or a homophily.

According to various example embodiments, a connection relationship between actors may signify that, for example, the actors are directly connected (e.g., as friends on Facebook® or as connections on LinkedIn®).

According to various example embodiments, a role relationship between actors may signify either a formal role or an informal role. Formal roles are also called named roles from a social science perspective, and examples of formal roles in various society structures include an employer-employee relationship, a supervisor-subordinate relationship, a colleague-colleague relationship, and so on. On the other hand, informal roles, which are also called unnamed roles from a social science perspective, signify less defined relationships between actors, such as when two actors are alumni of the same organization (e.g., alumni-alumni), or when two actors are friends, neighbors, former colleagues, etc. Accordingly, in some embodiments, the difference between formal and informal roles in many society structures may be that formal roles are more well-defined and carry with them the expectation of authority and responsibilities, whereas informal roles (e.g., neighbors) are relatively undefined in comparison. With reference to the example sociograph illustrated in FIG. 2, user X and user Z have a relationship corresponding to a formal role of "supervisor subordinate", whereas user Y and user Z have relationship corresponding to an informal role "alumni-alumni".

According to various example embodiments, a homophily relationship between actors represents shared attributes, such as shared interests (e.g., shared affiliations, shared topical interests, etc.), shared demographics (e.g., age, gender, location of employer, location of home, employment history, education background, etc.), and so on. For example, in a LinkedIn® space, user X and user Y may have a homophily because they're both located in Silicon Valley (e.g., they have the shared attribute of location), or because they have a shared interest in some topical space such as "Big Data", and so on. As another example, perhaps both user X and user Y are both members of or are interested in—a particular group, or work in the same company, or have the same role, and so on. With reference to the example sociograph illustrated in FIG. 2, it can be seen that user X and user Y have a relationship corresponding to homophily or shared interest(s). Other non-limiting examples of attributes that may be shared include, for example, age, gender, location, skills, current or previous employer, size of employer, position or job, seniority level, current or previous schools, education, interests (e.g., based on preferences, purchase history, viewing history, browsing history, social activity signals, membership in groups on a social network service, companies being followed, groups being followed, influencers being followed, schools or universities being followed, etc.), number of connections, identity of connections, and the like.

According to various example embodiments, the system 1000 is configured to determine the relationship between actors (e.g., based on member profile data of the actors on a social network service such as LinkedIn®), and to annotate the edges between the nodes corresponding to the actors in a sociograph, based on the aforementioned relationships. In some embodiments, data corresponding to the sociograph may be stored in a database. Note that there may be multiple relationships between two actors, such as when the two actors have a formal role, and an informal role, and shared interests/attributes, and so on. Accordingly, the system 1000 is capable of annotating multifaceted relationships between various actors.

In some embodiments, there may also be much richer, deeper annotations on a sociograph that are generated by the system 1000. For example, as illustrated in the example sociograph illustrated in FIG. 2, user Y graduated from University, and thus has relationship (e.g., alumni or graduate) with that university that can be annotated in association with an edge of the sociograph between the corresponding nodes. Such examples may apply to other entities that may not be universities (e.g., employers, companies, groups on a social network service such as LinkedIn, and so on). As described in more detail below, the system 1000 may also annotate the sociograph with interactions between actors, such as annotations signifying that a particular Institute or University certified the user Y with a degree or PhD in computer science.

Figure 3:
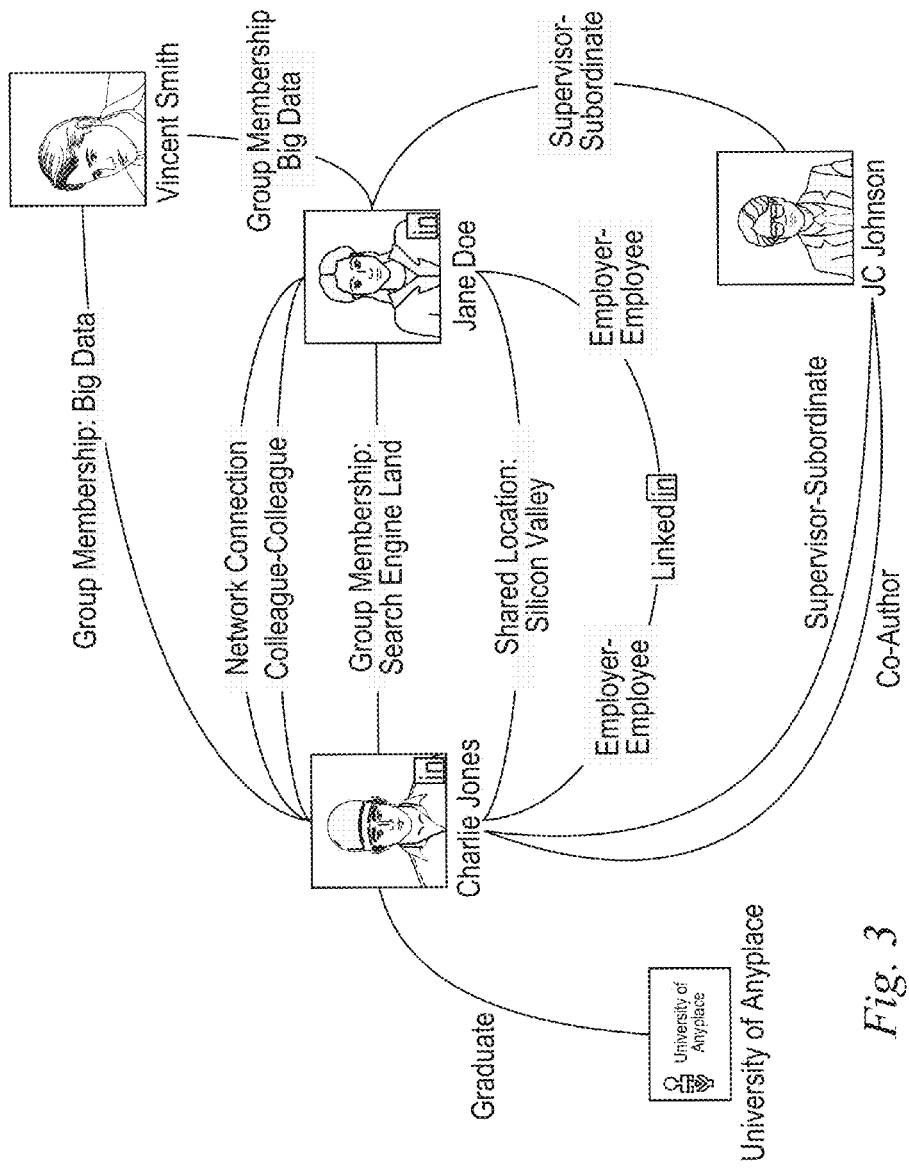
FIG. 3 illustrates an example sociograph, according to various embodiments.

FIG. 3 illustrates another example of a sociograph. As illustrated in FIG. 3, the actors Charlie Jones and Jane Doe share various relationships, as represented by the multiple edges between the notes corresponding to these actors. For example, the actors Charlie Jones and Jane Doe have a connection relationship, in that they are network connections on the LinkedIn® social network service. As another example, the actors Charlie Jones and Jane Doe share a homophily in terms of shared location ("Silicon Valley"), shared group membership (in the group "Search Engine Land"), and possibly other attributes. As another example, the actors Charlie Jones and Jane Doe have a named role relationship of Colleague-Colleague. Note that in FIG. 3, it can be seen that the actor Vincent Smith is not a direct network connection of Jane Doe or Charlie Jones (e.g., Charlie Jones and Jane Doe may not know Vincent Smith personally in any way). Nevertheless, Vincent Smith may be a member of a very popular group "Big Data" that both Charlie Jones and Jane Doe belong to. Accordingly, both Vincent Smith and Jane Doe share a homophily in terms of group membership in the group "Big Data". Thus, the sociographs described herein are detailed enough to represent various types of relationships between people even when people may not personally know each other (e.g., even when people are not directly connected to each other via social network), and the system 1000 may annotate this information on to the sociograph. Accordingly, the system 1000 may annotate incredibly rich, deep information associated with a large number of members (e.g., all the 260 million members of the social network service LinkedIn®) and a large number of entities (e.g., groups, companies, educational institutions, etc) in a multifaceted way to generate and enhance the sociograph.

1.3. Relationship Attributes:

In some embodiments, relationship attributes associated with actors may be annotated by the system 1000 as directed and undirected edges in a sociograph. For example, directed graph edges of a sociograph may have a specific direction (which may be visually represented by a unidirectional arrow on the edges), whereas undirected or bidirectional graph edges in a sociograph may be two-way and need not have specific direction (which may be visually represented by edges without any arrows, or alternatively by edges having bidirectional arrows). In some embodiments, the system 1000 may annotate edges of the sociograph with a specific direction in order to indicate various aspects of relationships between the corresponding actors. For example, if a first actor and a second actor work at the same organization and have a supervisor-subordinate relationship within the organization, then a directed edge or arrow between the actors may indicate a specific direction extending from the second actor to the first actor, to indicate that the second actor subordinate) reports to the first actor (supervisor) within the hierarchical structure of the organization. On the other hand, if a first actor and a second actor working at the same organization and have a colleague-colleague relationship within the organization, then a bidirectional edge or arrow between the actors may indicate the bidirectional nature of the relationship between the colleagues within the hierarchical structure of the organization According to various example embodiments described in more detail below, the system 1000 may annotate or weight the edges of the sociograph with weights referred to herein as "Relationship Weights" representing a measure of the strength of the underlying relationship. For example, a supervisor-subordinate "Relationship Weight" may be associated with an edge representing a supervisor-subordinate relationship, where the supervisor-subordinate "Relationship Weight" may be determined based on the number of years of collaboration in the supervisor-subordinate relationship, the number of years the supervisor-subordinate relationship has existed, and so on. As another example, the supervisor-subordinate "Relationship Weight" may represent a distance within the organizational chart in the hierarchy of the company or business (e.g., a direct supervisor relationship may be annotated with a stronger weighting in comparison to an indirect supervisor relationship).

1.4. Flows:

According to various example embodiments, the system 1000 may annotate a sociograph with flows or interactions between actors. As described herein, a flow represents an interaction between actors. Interactions may take many non-limiting forms and may include various types of actions indicating that the actors interacted with each other. Non-limiting examples of flows or interactions between users include when an actor interacts (e.g., views, clicks, likes, comments on, shares, follows, suggests, hides, etc.) with any content (e.g., a post, comment, status update, etc.) posted by or associated with another actor. Another example of a flow or interaction is when an actor messages another actor, such as a 1-1 flow indicating a communication (e.g., e-mail message, text message, instant message, team feed message, etc.) transmitted from a first actor to a second actor, or a 1-n communication transmitted from a first actor to a plurality of other actors. Another example of a flow or interaction is when a first actor endorses a second actor (e.g., by endorsing a skill of the second actor on a member profile page of the second actor), or when a first actor recommends a second actor (e.g., by posting recommendation on a member profile page of the second actor). Another example of a flow or interaction is when a first actor (e.g., a university or company) endorses a second actor (e.g., a member) as having a PhD degree in Computer Science or as having work experience in MAIL.

For example, referring back to FIG. 2, there is a flow or interaction between user Y and user X, since user Y liked a megaphone post that was posted by user X (e.g., a post in a group or a content feed of a social network service such as LinkedIn®). Moreover, as illustrated in FIG. 2, there is a flow or interaction between the user Z and the user X, since user Z endorsed a skill of user X (e.g., user Z endorsed the skill "Relevance" on the member profile page of the user X). Similarly, there is another flow or interaction between the user Y and user X, since the user Y endorsed the skill of user X (e.g., user Y endorsed the skill "Relevance" on the member profile page of the user X).

1.5 Concepts:

As described in more detail below, the term "concept"—as utilized throughout this disclosure—has two separate applications or uses. In a first example embodiment, the term "concept" refers to the content of a flow or interaction. In a second example embodiment, the term "concept" refers to a leadership description for the purposes of evaluating and substantiating leadership.

According to a first example embodiment, the content of a flow or interaction between actors may represent a generic concept. Thus, the generic concept may capture the essence of an interaction. With reference to the sociograph illustrated in FIG. 2, for example, a flow corresponds to a user Y interacting with a megaphone post or news article that was posted by user X (e.g., by liking, commenting on, sharing, following, etc., the post or article), and thus the concept that is the content of this flow or interaction is the underlying megaphone post or news article which can be characterized by the topics the article covers. As another example, a flow or interaction may correspond to the user Y endorsing a skill "Relevance" of the user X, and the concept that is the content of this interaction is the underlying skill "Relevance" of the user X (e.g., "X knows Relevance") that was endorsed. As another example, the sociograph in FIG. 7 indicates that the member Charlie Jones has posted an article on "Trends and Outliers", and the member Jane Doe has liked this article posted by Charlie Jones. In this case, the flow between Jane Doe and Charlie Jones corresponds to Jane Doe's interaction with the article posted by Charlie Jones. Accordingly, the content of this flow is the underlying article which represents the generic concept of this flow.

Figure 7:
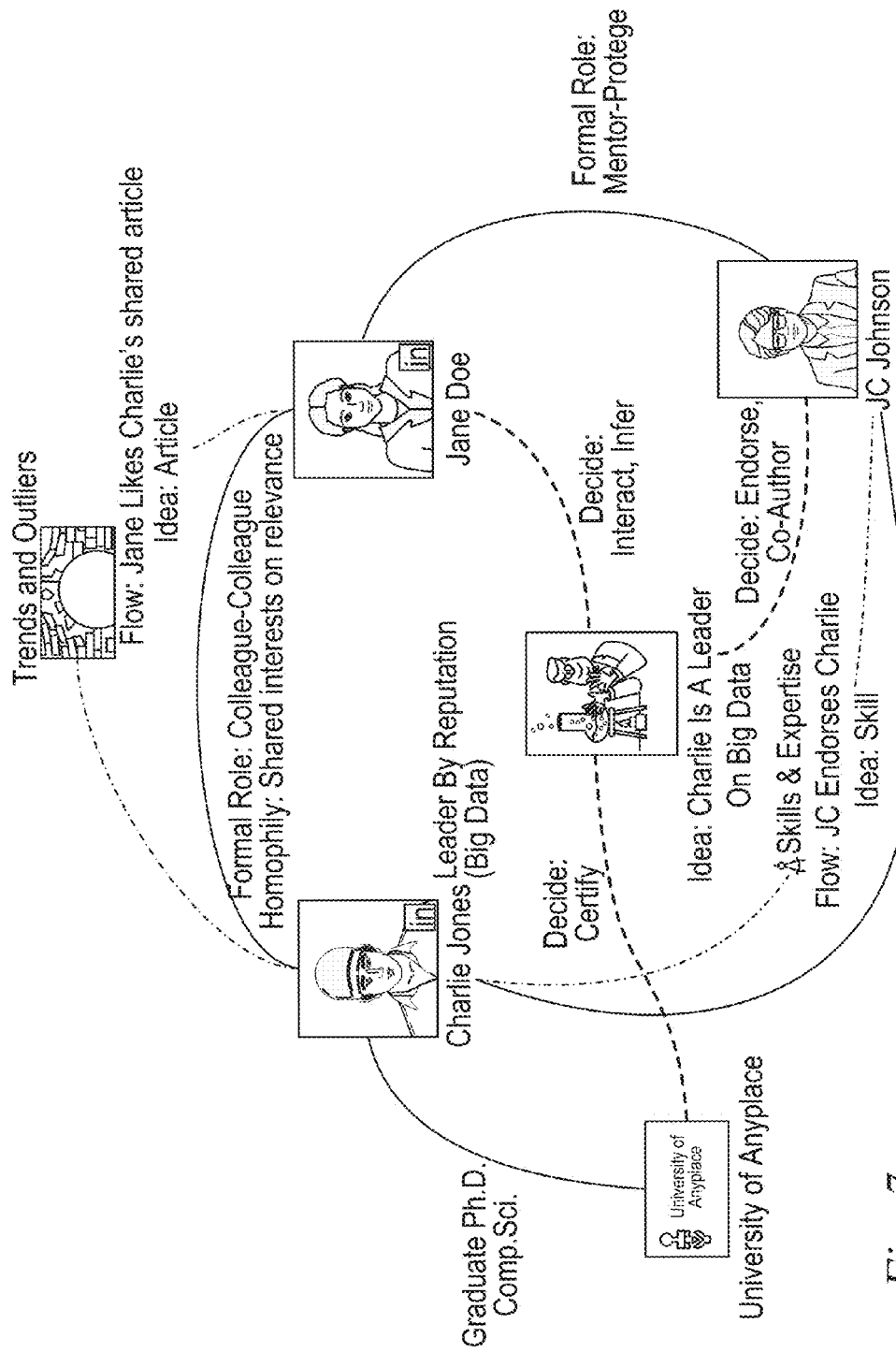
FIG. 7 illustrates an example sociograph, according to various embodiments.

According to a second example embodiment, a concept may refer to an unsubstantiated leadership description to be evaluated, such as "Charlie is a leader on Big Data" (see FIG. 7). As described in more detail below, the system 1000 is configured to evaluate the degree to which this concept or leadership description is substantiated in the social sense, based on a sociograph representing an online social network and the annotated information associated with this sociograph. More specifically, a reputation system may be utilized by the system 1000 to determine to what degree a concept or leadership description is substantiated, based on decisions, evaluations, and votes by actors in an online social network with respect to this concept or leadership description. For example, once a system identifies a concept such as "actor X knows subject S", the system 1000 determines whether the concept "actor X knows subject S" is substantiated by the social network of X, based on decisions, evaluations, and voting activity by the social network of X. Moreover, by substantiating such a concept, the system 1000 is able to determine leaders of the social network based on reputation. For example, after the system 1000 substantiates the concept of "actor X knows subject S" based on the decisions, evaluations, and voting activity by the social network of X, the system 1000 may determine that X is a reputation leader for the underlying subject S. Such aspects are described in greater detail below.

1.6. Contextual Sociographs

Accordingly to various example embodiments, a grand, unified sociograph may be annotated by the system 1000 to capture all relationship information accessed or maintained by the system 1000. In some embodiments, depending on the kind of leadership or social relevance aspects that may be of interest to the system 1000 at a given time, there may be a subset of those relationships in the grander sociograph that may make more sense and/or are of greater value.

For example, in various example embodiments, a grand unified sociograph can be leveraged by the system 1000 to generate sub-sociographs that are customized for a particular application. Such sub-sociographs may also be referred to herein as contextual sociographs, since these sociographs may be contextual depending on what the system 1000 is analyzing. In some embodiments, the system 1000 may generate the sub-sociographs by applying different "contextual weights" to the different relationships in the grander sociograph to represent the importance or relevance of certain relationships to a particular application or in a particular context. For example, the relationships having greater importance in a particular context may be assigned higher contextual weights and may be utilized to generate a corresponding contextualized sociograph for this particular context, which may or may not feature the relationships having lower contextual weights for this particular context.

Note that the "contextual weights" of relationships or edges described here may be distinct from the "relationship weights" of relationships or edges described above. More specifically, a "relationship weight" provides a measure of the strength of the underlying relationship. In contrast, a "contextual weight" signifies the relevance of a relationship in a particular context or application (e.g., the relevance of the relationship for the purposes of discovery and analysis of various leadership types, as described in more detail below). Thus, it is understood that a single relationship between two actors (as represented by a single edge between two nodes) may be associated with both a particular relationship weight and one or more contextual weights with respect to various applications and contexts.

As one example of contextual weights, if the system 1000 is attempting to understand information flow between actors, then sociograph components or annotations indicating whether members belong to a certain alumni may be less relevant, whereas shared interests or attributes (e.g., location, group member, etc.) between members may become more important. Accordingly, the system 1000 may apply different contextual weights to each of the relationships in the sociograph in order to generate a contextualized sub-sociograph.

Figure 4:
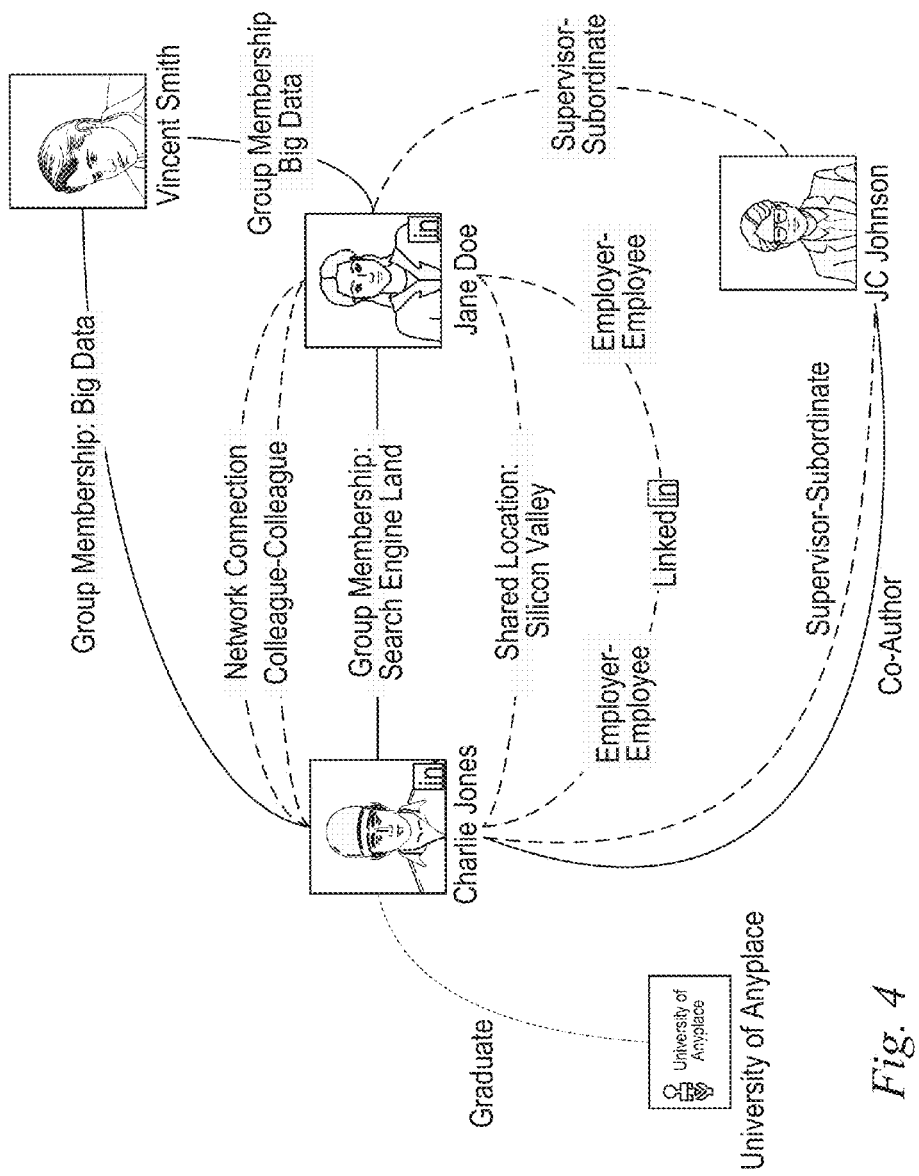
FIG. 4 illustrates an example sub-sociograph, according to various embodiments.

As another example of contextual weights, with reference to the example sociograph in FIG. 3, suppose the system 1000 is attempting to focus on topical interest (e.g. an interest in the topic of "Big Data"). In this case, some relationships in the sociograph may be more valuable than others. For example, even though Vincent Smith is not a network connection of Jane Doe or Charlie Jones, Vincent Smith has a group membership in a "Big Data" group, which is of importance and relevance to the topical interest of "Big Data", On the other hand, the supervisor-subordinate relationship between Jane Doe and J C Johnson may not be as important from this perspective. Accordingly, the system 1000 may process the sociograph illustrated in FIG. 3 to generate the sub-sociograph or contextual sociograph illustrated in FIG. 4 that emphasizes or weights certain relationships above others (by applying greater contextual weights to these relationships in comparison to others). For example, the group membership of Charlie Jones, Jane Doe, and Vincent Smith in the group "Big Data" and "Search Engine Land" may be assigned higher contextual weights, and the fact that Charlie Jones and J C Johnson are co-authors on a paper in this space may also be assigned a higher contextual weight. Accordingly, this subset of the sociograph in FIG. 2 becomes a true contextualized sociograph in and of itself, in this particular context of the topical interest of "Big Data".

Figure 5:
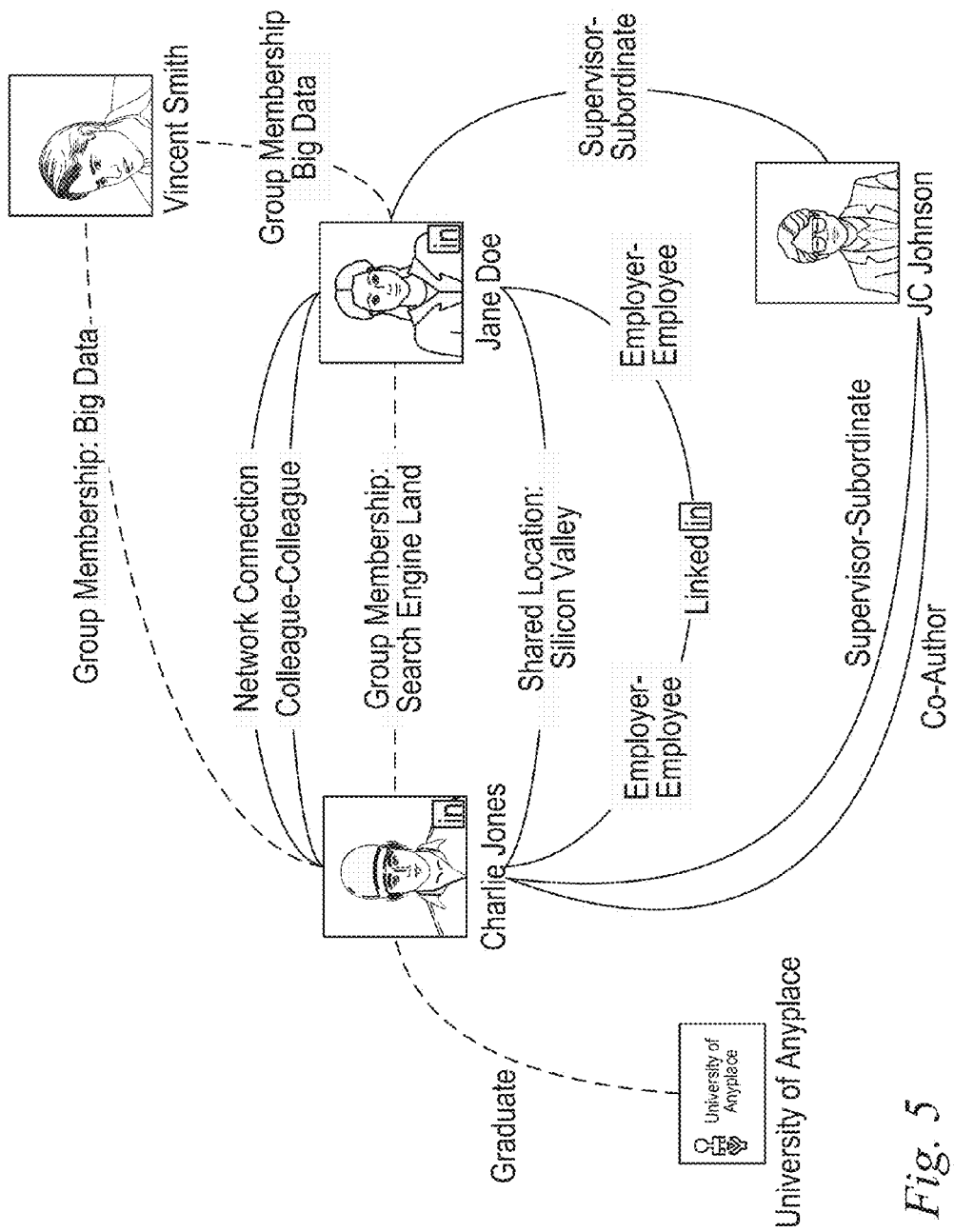
FIG. 5 illustrates an example sub-sociograph, according to various embodiments.

As another example of contextual weights, with reference again to the example sociograph in FIG. 3, suppose the system 1000 is attempting to focus on personal network relationships. In this case, the relationship between Jane Doe and J C Johnson may make more sense, because it is a true personal working relationship even though they may not work together on the topical space "Big Data"). Accordingly, the system 1000 may consider the relationship between Jane Doe and J C Johnson to be much stronger and more important in this context, and the system 1000 may apply high contextual weight to this relationship accordingly in the sub-sociograph in FIG. 5. Similarly, the homophily (e.g., shared location), network connection, and the colleague-colleague role that Jane Doe shares with Charlie Jones may become important in the sub-sociograph or contextual sociograph in FIG. 5, and the system 1000 may apply higher contextual weights to these relationships. On the other hand, the relationships between Vincent Smith and the other actors may be less relevant (since he has no personal network relationships with the other actors), and the system 1000 may apply lower contextual weights to these relationships accordingly, such that the resulting sub-sociograph does not reflect these relationships.

As another example described in more detail below in accordance with various example embodiments, relationships on a sociograph may be annotated by the system 1000 with different contextual weights for the purposes of the analysis and discovery of various leader types. For example, as described in more detail below, the system 1000 may determine different types of leaders in an online social network, and different relationships between actors in the sociograph may carry different contextual weight with respect to different leader types. For example, when the system 1000 is attempting to identify a Trigger-type leader, certain relationships between actors will become more important (e.g., shared group affiliation), and others will become less important (e.g., formal roles). Thus, based on a single grand unified sociograph representing all relationships, the system 1000 may identify a subset of relationships that are relevant to different types of leadership, and the system 1000 may thereby derive and generate different contextual sociographs in connection with efforts to identify different leader types.

Accordingly, the grand unified sociograph described herein may be annotated and processed to reveal different network topologies and to generate different sub-sociographs. Once the system 1000 analyzes a particular sub-sociograph or contextual sociograph, then the system 1000 can analyze the relevant social interactions between actors represented therein. Moreover, as described in more detail below, the system 1000 may optimize for information cascade (a.k.a. diffusion optimization and/or adoption), based on a subset of a sociograph (e.g., the contextual sociographs described above).

2. Leader Types:

According to various example embodiments, the system 1000 is configured to identify different types of leaders within an online social network. In some embodiments, the system 1000 may identify the leaders utilizing the unified sociographs and contextual sociographs described above. Examples of different types of leaders include an Authority-type leader, a Propagator-type leader, a Trigger-type leader, and a Broker-type leader.

As described in more detail below, each of the aforementioned leader types may be defined in conjunction with different types of social capital (e.g., information, relationships, or resources) in an online social network service. For example, in some embodiments, an Authority-type leader may be defined as an actor that possesses a particular type of social capital (e.g., information, relationships, or resources) or has a high influence within a network with respect to a particular type of social capital (e.g., information, relationships, or resources). As another example, in some embodiments, a Propagator-type leader may be defined as an actor that sources or spreads (i.e., amplifies the reach of) a particular type of social capital (e.g., information, relationships, or resources) within an online social network. As another example, in some embodiments, a Trigger-type leader may be defined as an actor that stimulates or seeds various activities of other members of an online social network with respect to a particular type of social capital (e.g., information, relationships, or resources). As another example, in some embodiments, a Broker-type leader may be defined as an actor that serves as a bridge connecting two or more sub-networks with respect to a particular type of social capital (e.g., information, relationships, or resources).

The characteristics of each type of leader, and how these characteristics tie back into the sociograph structure described above, will now be discussed in greater detail. Summaries of some of the characteristics of each type of leader as illustrated in the table in FIG. 9.

2.1. Identification Techniques:

As described in more detail below, the system 1000 is configured to identify leaders using two distinct techniques. More specifically, the system 1000 may identify leaders based on reputation, and the system 1000 may identify leaders based on connectedness by network topology. Note that the application of these techniques is not mutually exclusive, and the system 1000 may utilize these techniques in combination or separately. For example, the system 1000 may detect a Propagator based on reputation, or the system 1000 may identify a Propagator based on connectedness by network apology, or the system 1000 may detect a Propagator based on both reputation and connectedness by network topology.

2.2. Application to all Actor Types:

According to various example embodiments, the different leader types may apply to all actor types in the context of the sociograph. More specifically, a leader may either be a member (e.g., personal or individual), or an entity (e.g., a content producing entity), For example, a university may be an Authority-type leader on "computer science", or a company may be an Authority-type leader on "search engines", or a group may be a Propagator-type leader on "microeconomics", or a group may be a Trigger-type leader on "Big Data", and so on.

2.3. Authority:

According to various example embodiments, an Authority-type leader may be defined as an actor that possesses or provides access to a particular type of social capital (e.g., information, relationships, or resources) or has a high influence within a network with respect to a particular type of social capital (e.g., information, relationships, or resources).

For example, an Information Authority-type leader may be defined as an actor that possesses or provides access to the particular social capital of information, or has a high influence within a network with respect to the social capital of information. As another example, a Relationship Authority-type leader may be defined as an actor that possesses or provides access to the particular social capital of relationships, or has a high influence within a network with respect to the social capital of relationships. As another example, a Resources Authority-type leader may be defined as an actor that possesses or provides access to the particular social capital of resources, or has a high influence within a network with respect to the social capital of resources.

According to various example embodiments, such an Authority-type leader may be identified by reputation, using a reputation mechanism to determine whether network members have decided that the actor is an Authority (e.g., an Information Authority in a particular topical field or space). More specifically, a reputation mechanism of the system 1000 may analyze decisions, evaluations, and voting activity of other actors in a social network with respect to concepts, and based on this information, the reputation mechanism may determine a reputation score associated with an actor. Such a reputation score may then be utilized to determine whether the actor is an Authority-type leader or not.

2.3.1. Information Authority:

According to various example embodiments, an Information Authority-type leader may be defined as an actor that possesses or provides access to the particular social capital of information, or has a high influence within a network with respect to the social capital of information.

More specifically, in some embodiments, an Information Authority (also referred to herein as an expert) may be an actor that is an authoritative expert in a particular topic or space. In some embodiments, the role of an Information Authority is to create, endorse, certify, and/or curate information. For example, an information Authority on "Big Data" may write an article on Big Data and post it on an online social network, or may share, promote, or suggest an article on Big Data to other members, and so on. Accordingly, in some embodiments, Information Authority-type leadership may be topical, in that the Authority-type leader is an expert on a particular topic (e.g., "Big Data"). One specific example of an Information Authority-type leader is an academic expert in a particular field or topic.

With reference back to the sociograph framework described above, an Information Authority-type leader may be identified based on decisions from other actors in a social network. Examples of such decisions include when other actors endorse a particular member for a skill on their profile page, or when other actors view, like, share, suggests, follow, comment on, etc., a post by the particular member that is related to a given topic. Other examples of decisions include when a university certifies or endorses a member as having a machine learning PhD degree, or when a publication has accepted a paper or a certain number of papers associated with the member, or when other papers authored by other members include citations to a paper authored by the member, or when a member co-authors a paper with other members, and so on. As another example, a group may certify the member as having some type of position within the group (e.g., moderator, conference chair, leader, etc.).

Since some of these example relationships are more pertinent or contextual than others for the determination of an Information Authority-type leader, the system 1000 may process a sociograph in order to generate a sub-sociograph or contextual sociograph that contextually weights these types of relationships higher than other types of relationships.

In some embodiments, Information Authority-type leadership can be local or global. For example, the system 1000 may determine that a particular actor is a leader within a specific local sub-network, based on the voting or decision activity by members in the sub-network, even though that particular actor may not be considered a leader in a larger social network. On the other hand, the decisions or voting activity by actors in the greater social network may indicate that a particular actor is a leader with respect to the global social network.

In some embodiments, the system 1000 treats leadership as transitive, such that Information Authority-type leadership on a particular topic can also be generalized beyond that particular topic to other topics. In other words, users may trust the opinion of the Information Authority on a certain topical space, and this may be transitive to the global space. For example, suppose the system 1000 determines that the actor Deepak Chopra is an Information Authority or expert on emotional quotients, based on him being endorsed for this topic by other members, or based on a citation analysis of papers by other experts that cite his work, and so on. Now, if Deepak Chopra begins to post information about politics, people may start to pay attention and interact with this content, even though his expertise on politics is not strictly transferable from his expertise on emotional quotients. Nevertheless, the system 1000 may determine that the actor Deepak Chopra is now an Information Authority-type leader on politics, based on the decisions, evaluations, and voting activity by others in his network.

While various embodiments above refer to an academic expert as an example of an Information Authority, another example of an Information Authority is an influencer or a celebrity that may or may not be a true academic expert or subject matter expert. For example, endorsements by celebrities from popular culture may result in great commercial success for the endorsed product, even though the celebrity may not be an academic expert or a subject matter expert on any particular topic (e.g., the product being endorsed). Nevertheless, such a celebrity may be considered by their social network to be an expert on the product, as evidenced by the decisions, evaluations, and voting activity of other actors in their social network.

2.3.2. Relationship Authority:

According to various example embodiments, a Relationship Authority-type leader may be defined as an actor that possesses or provides access to the particular social capital of relationships, or has a high influence within a network with respect to the social capital of relationships. Examples of Relationship Authorities include actors of high socio-economic status in a network, CXOs of a company or organization, celebrities in a profession, and so on.

2.3.3. Resources Authority:

According to various example embodiments, a Resources Authority-type leader may be defined as an actor that possesses or provides access to the particular social capital of resources (e.g., jobs, money, or visibility), or has a high influence within a network with respect to the social capital of resources (e.g., jobs, money, or visibility). Examples of resources authorities include actors such as hiring manager (who possesses or provides access to jobs), an investor or a venture capitalist (who possesses or provides access to money), a journalist who covers the story of a person (who provides access to media visibility), and so on.

2.4. Propagator:

According to various example embodiments, a Propagator-type leader may be defined as an actor that sources or spreads (i.e., amplifies the reach of) a particular type of social capital (e.g., information, relationships, or resources) within an online social network. For example, an Information Propagator may be defined as an actor that sources or spreads (i.e., amplifies the reach of) the particular social capital of information within an online social network. As another example, a Relationship Propagator may be defined as an actor that sources or spreads (i.e., amplifies the reach of) the particular social capital of relationships within an online social network. As another example, a Resources Propagator may be defined as an actor that sources or spreads (i.e., amplifies the reach of) the particular social capital of resources within an online social network.

2.4.1. Information Propagator:

According to various example embodiments, an Information Propagator may be defined as an actor that sources or spreads (i.e., amplifies the reach of) the particular social capital of information within an online social network.

For example, in some embodiments, an Information Propagator also referred to herein as the broadcaster) is an actor that spreads high quality information to a large group of members within a local or global network. Accordingly, Information Propagators may be actors who share and/or curate information and act as social filters, and they may be viewed as trend setters in terms of sharing information. An example of an Information Propagator is a person with 10 million followers on Twitter® or 2000 connections on LinkedIn®, who is very adept at identifying content that may be interesting to others, and who shares this content to a large number of followers. Thus, any information that an Information Propagator posts is rapidly spread to a large number of other people.

In some embodiments, an Information Propagator may not himself be the creator of some content, but the system 1000 may still classify him as an Information Propagator due to the fact that he shares and spreads that content. Information Propagators may also be referred to herein as mediums because they can be analogized to a medium that distributes or carries information. Similarly, Information Propagators may also be referred to herein as content curators or social curators, since they curate the spread of information in a social network.

In some embodiments, an Information Propagator may be considered to be similar in some ways to a journalist. For example, a journalist traditionally decides what information is disseminated to other users. Of course, an Information Propagator-type leader is not limited to a traditional journalist. In fact, due to the recent democratization of content on the Internet, the public rely less on traditional journalists. Instead, today any member of the public may publish information to a social network, and if the member gathers sufficient followers, then he may effectively become a content curator or Information Propagator-type leader as described herein. Accordingly, an information Propagator may be viewed as a democratized journalist.

According to various example embodiments, an Information Propagator may be identified based on reputation. For example, the system 1000 may detect interactions between other actors and an Information Propagator, where the interactions may correspond to the other actors following the Information Propagator, connecting to the Information Propagator, consuming or interacting with (e.g., viewing, sharing, liking, following, suggesting, commenting, etc.) content that is posted or shared by the Information Propagator. In some embodiments, content shared by the Information Propagator may be related to a very narrow topic (e.g., micro-finance in South India) or to a general topic (e.g., business), or may be a specific type or kind of content such as entertaining or humorous content, educational content, insightful content, and so on.

In some embodiments, an Information Propagator may be identified by connectedness of network topology. For example, the Information Propagator may be identified based on the extent and reach of their network (i.e., high network reach, such as a group moderator). For example, if an actor posts some content, and a large number of her followers, network connections, fellow group members, etc., disseminate it, then that actor has a much broader reach than other actors, and the system 1000 may determine that that actor is an Information Propagator-type leader.

2.4.2. Relationship Propagator:

According to various example embodiments, a Relationship Propagator may be defined as an actor that sources or spreads (i.e., amplifies the reach of) the particular social capital of relationships within an online social network. An example of Relationship Propagators include recruiters that source talents for companies.

2.4.3. Resources Propagator:

According to various example embodiments, a Resources Propagator may be defined as an actor that sources or spreads (i.e., amplifies the reach of) the particular social capital of resources (e.g., jobs, money, visibility) within an online social network, Examples of resources propagators include the entity LinkedIn that spreads job opportunities to the community via a jobs platform, a venture capitalist that spreads money to entrepreneurs, a media channel that spreads the media coverage or visibility of a person to the community.

2.5. Trigger:

According to various example embodiments, a Trigger-type leader may be defined as an actor that stimulates or seeds various activities of other members of an online social network with respect to a particular type of social capital (e.g., information, relationships, or resources), For example, an Information Trigger may be defined as an actor that stimulates or seeds various activities (e.g., conversations) among members of an online social network with respect to the particular social capital of information. As another example, a Relationship Trigger may be defined as an actor that stimulates or seeds various activities (e.g., the formation of new relationships or connections between members) among members of an online social network with respect to the particular social capital of relationships. As another example, a Resources Trigger may be defined as an actor that stimulates or seeds various activities (e.g., job fairs, investment rounds, community discussions and dialogue) among members of an online social network with respect to the particular social capital of resources (e.g., jobs, money, visibility). According to various example embodiments described in more detail below, Trigger-type leader may be identified based on reputation.

2.5.1. Information Trigger:

According to various example embodiments, an Information Trigger may be defined as an actor that stimulates or seeds various activities (e.g., conversations) among members of an online social network with respect to the particular social capital of information.

For example, in some embodiments, an Information Trigger (also referred to herein as a provocateur) is an actor that stimulates discussions and conversations, such as by asking provocative questions or making unconventional statements. The role of the Information Trigger is thus to seed conversations and to precipitate and stimulate discussion within an online social network. In other words, Information Triggers may have the ability to generate conversations that many other actors like to engage with and converse on, which generates a tot of interest and encourages further discussion. Thus, Information Triggers may contribute to the diffusion of information in a social network by asking provocative questions, posting provocative content, and so on.

According to various example embodiments, and Information Trigger-type leader may be identified based on reputation. For example, when the Information Trigger posts an article, message, comment, or status update related to "Big Data", the interactions of other members with this posted content may be represented by annotated flows in the sociograph. A reputation system may evaluate these interactions between members of the social network in order to identify Information Triggers. For example, the system 1000 may detect an Information Trigger by determining that many other members are interacting with (e.g., viewing, commenting on, sharing, etc.) the information Trigger's posts. For example, the system 1000 may detect that a potential Information Trigger's post has generated a lot of comments within a short period of time after being posted.

As described above, they system may generate sub-sociograph for the purposes of identifying a particular type of leader. Accordingly, in order to identify an Information Trigger-type leader, the system 1000 may generate a sub-sociograph where certain types of interactions may be heavily weighted contextually, such as interactions (e.g., comments) submitted by other members in connection with content posted or shared by the Information Trigger. On the other hand, the title, skills, and positions of the Information Trigger, or the role-type relationships that the Information Trigger may have with other members, may be less relevant in this context, and thus may be omitted from the corresponding sub-sociograph in some example embodiments.

2.5.2. Relationship Trigger:

As another example, a Relationship Trigger may be defined as an actor that stimulates or seeds various activities (e.g., the formation of new relationships or connections between members) among members of an online social network with respect to the particular social capital of relationships. Examples of relationship triggers include a networker or hub that brings other actors together.

2.5.3. Resources Trigger:

As another example, a Resources Trigger may be defined as an actor that stimulates or seeds various activities (e.g., job fairs, investment rounds, community discussions and dialogue) among members of an online social network with respect to the particular social capital of resources (e.g., jobs, money, visibility). Examples of resources triggers include a University that stimulates job activities with job fair events (job), a government that stimulates investments in green tech industry (investment), a marketer that stimulates community discussion and visibility of a new product, and so on.

2.6. Broker:

According to various example embodiments, a Broker-type leader may be defined as an actor that serves as a bridge connecting two or more sub-networks with respect to a particular type of social capital (e.g., information, relationships, or resources). For example, an Information Broker may be defined as an actor that serves as a bridge connecting two or more sub-networks with respect to the particular social capital of information. As another example, a Relationship Broker may be defined as an actor that serves as a bridge connecting two or more sub-networks with respect to the particular social capital of relationships. As another example, a Resources Broker may be defined as an actor that serves as a bridge connecting two or more sub-networks with respect to the particular social capital of resources.

2.6.1. Information Broker

According to various example embodiments, an Information Broker (also referred to herein as an "Information Connector") may be defined as an actor that serves as a bridge connecting two or more sub-networks with respect to the particular social capital of information.

For example, in some embodiments, an Information Broker is an actor that serves as an information bridge or information connector between two networks which would otherwise may be disjoint (e.g., networks that otherwise would have little or no information flow between them). Thus, the role of an Information Broker is to broaden the information boundary of other members. The social capital for Information Broker is information and the potential access to information that such Information Brokers may provide to others.

For the purposes of comparison, while a Propagator spreads information widely to different consumers which may or may not be in the same network as the Propagator, an information Broker connects two or more distinct networks. In some embodiments, the type of leadership associated with an Information Broker is local rather than global because it may be highly dependent on the local network topology proximate to the corresponding Information Broker.

In some examples, Information Brokers may be important because many people join social networks such as LinkedIn® because they have a job or functional role, or are interested in specific topical space. Such members typically join densely connected groups or cliques on the social network that are somehow associated with their jobs, companies, roles, or topical spaces of interest (e.g., most of their connections are from companies that the user has worked with or schools that the user attended, or connections with groups associated with the user's topics of interest, etc.). However, after such members join such sub-networks, the diffusion of information to these members is often limited in such a way that there is a great deal of information that they do not receive and, indeed, that they do not even know exists. In effect, the members tend to exist in their own little bubble of their sub-network, and become enveloped in an information mentality associated with their sub-network. For example, by looking at the diffusion of information in the sociograph, it may be determined that a particular member tends to receive information from other users only if they belong to the same network, or if the particular member follows the other users, or if the particular member and the other users are in the same group, and so on. Accordingly, such members will only know about—and have access to—information, relationships, and resources that available in their immediate circle, but not beyond that. As a result, such members may never receive information from outside their dense sub-network or group. In some cases, such members may be aware of information that they do not have access to, but often they may not even be aware of the information they do not know.

Accordingly, the identification of Information Brokers may be incredibly important for understanding and optimizing the diffusion of information in a social network, as they act as the bridge between different groups of people. In effect, Information Brokers permit other users to broaden their perspective and expand their world, and without them, the flow and diffusion of information between distinct sub-networks may be reduced or severely curtailed.

According to various example embodiments, Information connectors may be identified by the system 1000 based on connectedness of network topology. For example, the system 1000 may identify an information Broker as anode in the sociograph with connections to two or more densely connected groups of people, where if the node corresponding to the Information Broker is removed, these two densely connected groups of people will no longer have any connections to each other (e.g., the members of one group will no longer have a chance to interact with the members of the other group).

Figure 6:
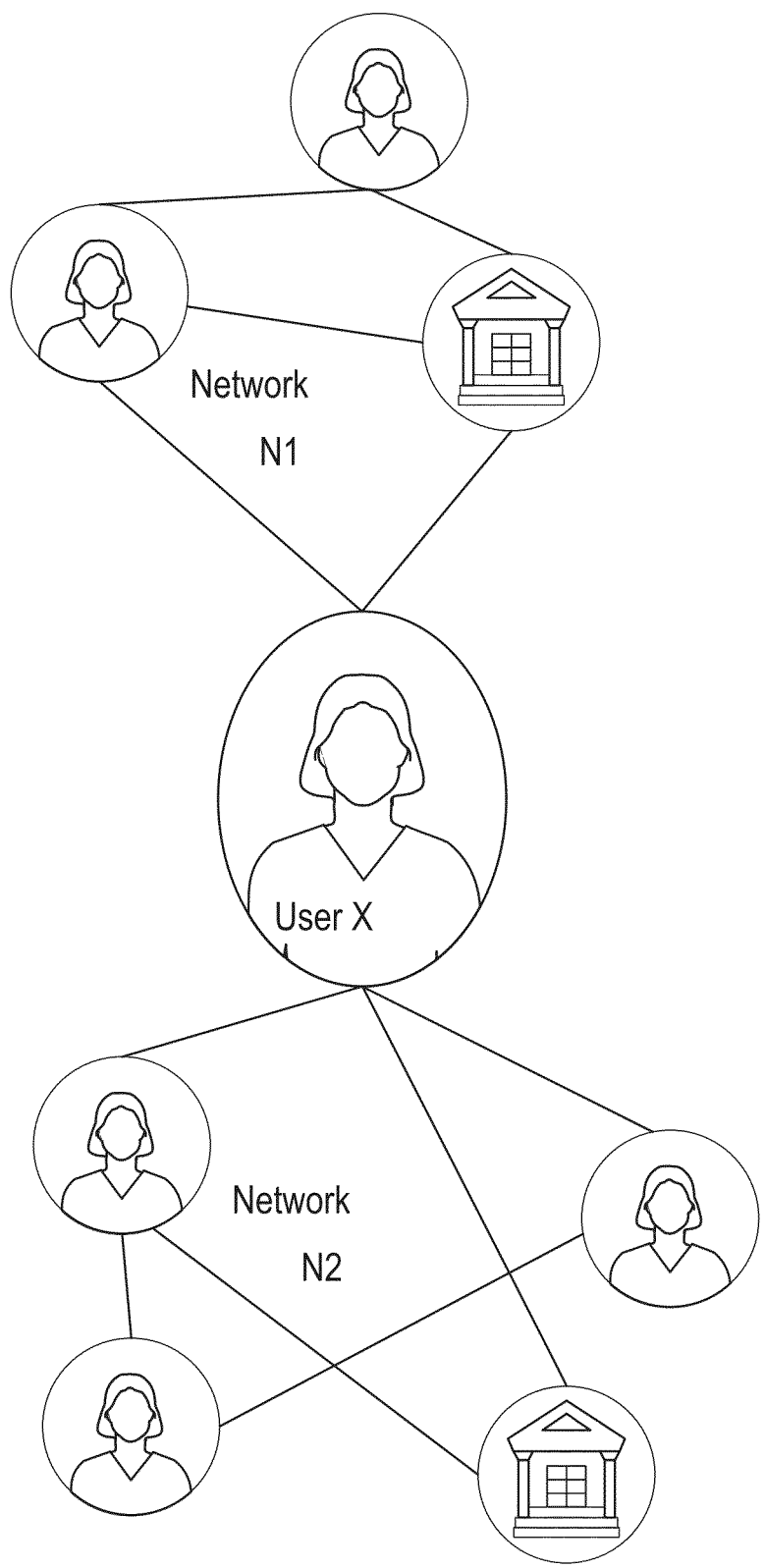
FIG. 6 illustrates an example sociograph, according to various embodiments.
Figure 8:
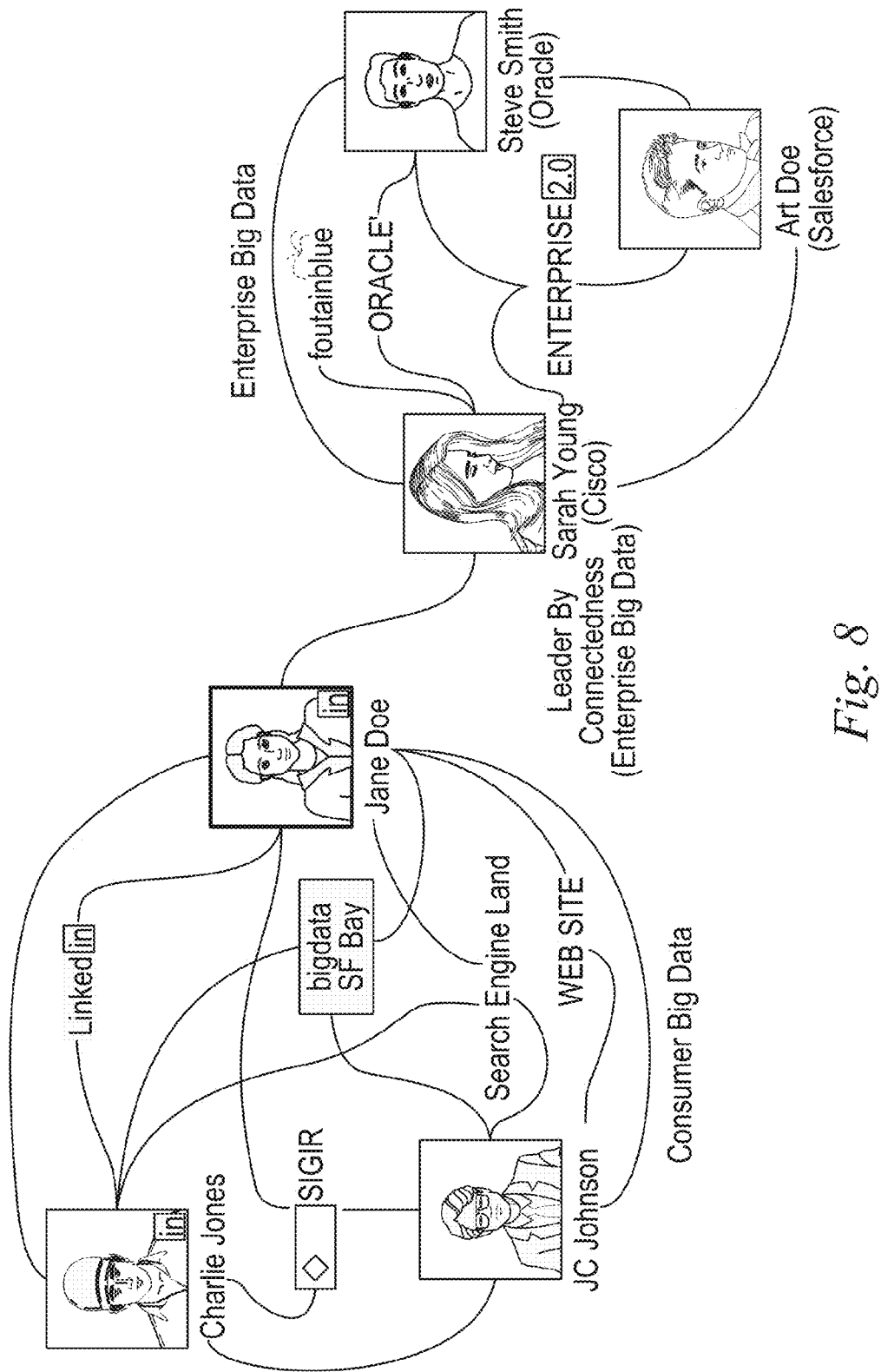
FIG. 8 illustrates an example sociograph, according to various embodiments.

For example, FIG. 6 illustrates an example of a densely connected network N1, a densely connected network N2, and the member X that acts as an information connector between these densely connected networks, if the member X is removed from the sociograph, the actors in network N1 will not have any direct connections to the actors in network. N2, and vice versa. Accordingly, the information Broker actor X becomes a bridge of these two groups. As another example, FIG. 8 illustrates an example of a densely connected network "Consumer Big Data", a densely connected network "Enterprise Data", and the member Sarah Young that acts as an information broker between these densely connected networks, if the member Sarah Young is removed from the sociograph, the actors in the "Consumer Big Data" network will not have any direct connections to the actors in the "Enterprise Big Data" network, and vice versa. Accordingly, the Information Broker actor Sarah Young becomes a bridge of these two groups.

Thus, Information Brokers play a centrality role in terms of bridging the gaps between densely connected networks, and of improving the efficacy and ability of users to see more of the world than they otherwise would. In some examples, Information Brokers may exist on the adjacency or edges of densely connected sub-networks or groups, groups or cliques, and may have weak ties to the members in one or more of these densely connected sub-networks or groups. According to various example embodiments, the system 1000 may generate a contextual sociograph for an Information Broker that focuses on information flow (e.g., the interaction of members with content posted by other members).

2.6.2. Relationship Broker

According to various example embodiments, a Relationship Broker may be defined as an actor that serves as a bridge connecting two or more sub-networks with respect to the particular social capital of relationships.

For example, in some embodiments, a Relationship Broker may be similar to an Information Broker, where a Relationship Broker provides their network connections with opportunities for forming relationship with members in other sub-networks—opportunities that the Relationship Broker's connections might not have, if not for their connection with the Relationship Broker. For example, with reference to FIG. 8, the relationship broker Sarah Young may provide the only connection to the company Oracle to the users in the "Consumer Big Data" network (who otherwise would not have a connection to the company Oracle).

For the purposes of comparison, whereas the contextual sociograph for an Information Broker focuses on information flow, the contextual sociograph for a Relationship Broker focuses on personal relationships. Similarly, whereas the social capital for an Information Broker is information, the social capital for a Relationship Broker is relationships and the potential access to relationships.

2.6.3. Resources Broker

According to various example embodiments, a Resources Broker may be defined as an actor that serves as a bridge connecting two or more sub-networks with respect to the particular social capital of resources.

For example, in some embodiments, a Resources Broker may be similar to an Information Broker, where a Resources Broker provides their network connections with opportunities for accessing resources from members in other sub-networks—opportunities that the Resources Broker's connections might not have, if not for their connection with the Resources Broker. Examples of Resource Brokers are VCs and recruiters.

For the purposes of comparison, whereas the contextual sociograph for an information Broker focuses on information flow, the contextual sociograph for a Resources Broker focuses on access to opportunities (e.g., companies, groups, institute affiliations, socio-economic status), Similarly, whereas the social capital for an information Broker is information, the social capital for resource connectors is the potential access to resources such as money, funding, job opportunities, etc.

3. Leadership by Reputation:

According to various example embodiments, a reputation mechanism is configured to determine if a particular actor is a reputation leader on a particular subject, by evaluating the decisions of actors in a social network with respect to various concepts or ideas.

As illustrated in the example of FIG. 7, an example of a concept is "Charlie is a leader in Big Data". Accordingly, the system 1000 may analyze the interactions in the social network in order to determine if other actors have submitted decisions or evaluations that substantiate this concept of "Charlie is a leader in Big Data". An example of such a decision is if the actor Jane Doe likes Charlie Jones's shared article on Big Data, or if the actor J C Johnson endorses Charlie Jones's skills on Big Data on Charlie Jones's member profile page, or if the actor J C Johnson co-authors a paper on Big Data with Charlie Jones, or if the actor University of Anyplace certifies Charlie Jones for a degree in Big Data, and so on.

For example, with reference to FIG. 7, consider the actor J C Johnson's decision on the concept of whether Charlie Jones is a leader by reputation on the subject of Big Data. J C Johnson has expressed this decision by endorsing Charlie Jones for the skill of Big Data, and by co-authoring a paper with Charlie Jones. The strength of this evaluation may depend on 1) J C Johnson's knowledge, leadership, or reputation on the subject of Big Data, 2) J C Johnson's relationship with Charlie Jones, and/or 3) the nature or decision type of J C Johnson's endorsement. With respect to 1) and 2), the system 1000 may determine that, for example, J C Johnson is a reputation leader on Big Data and that he has a strong relationship with Charlie Jones (e.g., a formal relationship rote of mentor-protégé and an informal relationship role of co-authors on a paper). Accordingly, both of these factors will strengthen the decision of J C Johnson. Moreover, with respect to 3), the system 1000 may determine that the decision type of co-authoring a paper on Big Data carries greater weight than the decision type of endorsing Charlie Jones for the skill of Big Data on Charlie Jones's member profile page. Accordingly, J C Johnson's decision as expressed by co-authoring a paper with Charlie Jones may carry greater weight than J C Johnson's decision as expressed by endorsing Charlie Jones for the skill of Big Data on Charlie Jones's member profile page.

As another example, consider the actor University of Anyplace's decision on the concept of whether Charlie Jones is a leader by reputation on the subject of Big Data, as expressed by the University certifying that Charlie Jones has a technical degree in machine learning. The system 1000 may determine a strong relationship between Charlie Jones and the University of Anyplace (e.g., because Charlie Jones graduated with a PhD in computer science from this university). Moreover, the system 1000 may determine that the certification may carry different weights depending on the reputation of the University of Anyplace itself. For example, if the University of Anyplace is highly reputable in that space, then any decisions from that actor in that space carry more weight. The decision type/action of the certification on the part of the University also carries a weight itself, in comparison to other acts that the university could take. For example, certifying an advanced degree may carry greater weight than certifying a less advanced degree.

Now consider the actor Jane Doe's decision on the concept of whether Charlie Jones is a leader by reputation on the subject of Big Data. As described in more detail below, Jane Doe's decision may be influenced by a personal decision made by Jane Doe (e.g., Jane Doe's own evaluation of Charlie Jones, based on Jane Doe's relationship with Charlie Jones and/or Jane Doe's knowledge of the subject of Big Data). Moreover, Jane Doe's decision may be influenced by a social decision made by Jane Doe—i.e., Jane Doe's evaluation of other people's evaluations. For example, J C Johnson's decision on Charlie Jones being a leader on Big Data, the relationship between J C Johnson and Jane Doe, J C Johnson's leadership on Big Data, and J C Johnson's relationship strength with Charlie Jones are all social factors contributing to Jane Doe's decision on whether Charlie Jones is a leader by reputation on the subject of Big Data.

According to various example embodiments described in more detail below, the system 1000 is configured to calculate a decision score associated with each decision by an actor Y a concept. Each decision by actor Y may be a combination of a personal decision and a social decision in a recursive manner. Accordingly, the decision score for a particular decision by actor Y is based on a several factors.

For individual, personal decisions by actor Y with respect to whether user X is a reputation leader on subject S, the decision score may be generated based on:

a) Y's knowledge, reputation, and/or leadership on the subject S. For example, if the user Y is a Big Data expert, user Y can evaluate better whether user X is a Big Data expert, based on user Y's knowledge of the field of Big Data. Accordingly, user Y's actions (e.g., endorsing an article on Big Data posted by a user X) may carry more weight if user Y has a high reputation (e.g., is a reputation leader) with respect to the subject of Big Data. Similarly, if Y corresponds to a university entity, then Y's actions (e.g., certifying or endorsing user X for a PhD degree in computer science) may carry more weight if entity Y has a high reputation itself (e.g., is a reputation leader) with respect to the subject of Big Data.

b) Y's relationship with the actor X: For example, if the actor Y knows the actor X well, this may affect actor Y's decision of whether actor X is a reputation leader on subject S. Accordingly, actor Y's actions (e.g., endorsing an article on Big Data posted by actor X) may carry more weight if actor Y has a stronger relationship with actor X (e.g., actor Y has been a direct supervisor of actor X for over 10 years). This carries more weight than if some John Doe endorses actor X. As another example, if actor Y corresponds to a university entity, then entity Y's actions (e.g., certifying or endorsing user X for a PhD degree in computer science) may carry more weight if entity Y has a strong relationship with actor X (e.g., if entity Y is the alma mater of actor X).

c) Decision type T of the decision by Y: Actor Y has many choices of how to express their decision or evaluation on a concept, where each decision type carries different weights. As one example, actor Y may visit the homepage of actor X and endorse them for a skill, which may carry a relatively low weight in some example embodiments. As another example, actor Y may comment positively on a post by actor X, which may carry a greater weight in some example embodiments. As another example, actor Y may write a 1000 word recommendation for actor X and post it on actor X's home page, or actor Y can write a blog post stating that actor X is an expert on the subject S of Big Data, which may carry much greater weight in some example embodiments. If actor Y corresponds to a university entity, then the University may certify user X and tell the whole world that actor X has a PhD in computer science, which may carry greater weight than if the University simply likes a post by actor X.

d) Decision weight: This refers to the degree of decision that can be captured as binary or numeric scores. For example, Y may endorse X for a skill. The decision weight is 1 (binary). Y may comment on X's posts very frequently captured as 0.9 over the range of 0 to 1.

For social decisions by actor Y with respect to whether user X is a reputation leader on subject S, the decision score may be generated based on:

a) Same as above for all members Z in the sociograph. In other words, each Z also makes a decision on the concept, and the system 1000 calculates the corresponding decision scores for each decision.

b) The decision of actor Y may then depend recursively on the strength of the actor Y's relationship with each of Z, and the decision scores for the respective decisions by each of Z (which may capture Z's leadership on the S, Z's relationship with X, and so on). In other words, if actor Y trusts the judgment of actor Z, and if actor Z says actor X is a reputation leader on subject S, then actor Y may be likely to trust and follow the decision of actor Z. Accordingly, if actor Y has a very close relationship with actor Z, and the actor Z has a high decision score with respect to a concept, then the decision score of actor Y's own decision with respect to that concept may be increased. On the other hand, if actor Y has a very weak relationship with actor Z, and the actor Z has a low decision score with respect to a concept, then the decision score of actor Y's own decision with respect to that concept might not be increased significantly.

According to various example embodiments, the concept that actor X is a reputation leader (e.g., an Authority or expert) for a subject S may be represented as Concept (X, S). The decision score for the net decision that a single actor Y makes with respect to a concept (e.g., Concept (X, S)), may be represented as Decision (Concept (X, S)|Y).

This net decision may be generated based on personal decisions by the actor Y, well as social decisions by actor Y. In other words, the net decision score may be generated based on a personal decision score and a social decision score. The personal decision score for the personal decision by actor Y may be represented by Decide(Concept(X, S), T|Y), which denotes Y's decision on a concept (for all decision types T). The social decision score for the social decision by actor Y may be based on: Decide(Concept(X, S)|Z), which denotes Z's net decision on the concept (for all Z); and the relationships between Y and Z. For example, if the relationship is strong in the contextual sociograph particular to the reputation, then Z's net decision carries more weight to Y.

Based on the net decision scores for all members of a group, the system 1000 may generate a reputation leadership score associated with the actor X and the subject S. For example, based on Decision (Concept (X, S)|Y G) (net decision of all members Y in group G), the system 1000 may generate a reputation leadership score associated with Concept (X, S). Based on this reputation leadership score, the system 1000 may determine that actor X is a reputation leader on subject S (e.g., if the reputation leadership score is greater than a predetermined threshold).

Various definitions and example representations are described in more detail below.

3.1. Reputation Transitivity:

Reputation may be transitive. For example, in some embodiments, reputation is transitive in terms of network reach. X's reputation on S is at first limited to a sub-network. As actors start to form decision on X's reputation and influence each other, X's reputation spreads across the network. This is in part due to (a) there can be non-zero impact of Z's decision on X's reputation to Y's decision even when Z and Y do not have relationships, and (b) Y and Z's decisions are inter-dependent and influence each other socially.

In another sense, reputation is transitive in terms of subject. It is observed that when X becomes a leader on S among a network, actors in the network gives higher reputation score of X on other subjects. For example, Barak Obama is a reputable leader on politics. Because of that, members of the society trust Obama's opinion on parenting.

3.2. Decide (Concept(X, S), T|Y): Y personally (exclude social factors) decision (numeric) on the concept of X being a reputable leader on subject S based on decision type T. Decision is based on Y's relationship with X, Y's leadership on S, and Decision type T.

3.2.1. Examples of Decision Type T Include:

3.2.1.1. Y view/click/like/comment on X's post. Applications include Authority Leader, Propagator Leader, Information Broker, Trigger.

3.2.1.2. Y endorse/recommend X on skill S. Applications include Authority Leader.

3.2.1.3. X self-claims obtaining degree on subject S (Y=X) or X self-claims working at an entity Y.

3.2.1.4. Y (e.g., a university) certifies X earns degree on subject S or Y (e.g., a company) certifies X as an employee.

3.2.1.5. Y co-authors with X in some paper.

3.2.1.6. Y cites X's paper.

3.2.1.7, Y references X.

3.2.1.8. Y follows X.

3.2.2. Examples of subject S include:

3.2.2.1. Topics, including professional topics, such as "Big Data" or "search engines"

3.2.2.2. Roles, experiences, and skills, such as product management, entrepreneurship 3.2.2.3. Style, such as team player 3.2.2.4. Can also be null (general)

3.3. Decide (Concept(X, S)|Y): Y's net decision on the concept of X being a reputable leader on subject S. It is based on:

3.3.1, Decide(Concept(X, S), T|Y): Y's decision on the concept (for all T)

3.3.2. Decide(Concept(X, S)|Z): Z's net decision on the concept (for all Z)

This recursively captures Z's relationship with X, the leadership of Z on S. Decision type T of each decision by Z, and so on.

3.3.3. Relationships between Y and Z. Example, if the relationship is strong in the contextual sociograph particular to the reputation, Z's net decision carries more weight to Y.

In the case there is no relationships between Y and Z, there is still non-zero impact of the collective decision of all other members on Y, intuitively referring to global reputation as captured in Decide (Concept (X, S)|G=all). (Recursive definition c.f. PageRank)

3.4. Decide(Concept(X, S)|G): Reputation leadership score of X being reputable on subject S for a given group G.

3.4.1. G: It can be limited to a local (sub-)network. It can also be global including all members in the contextual sociograph—denoted as Decide(Concept(X, S)).

3.4.2. It is based on Decide (Concept (X, S)|Y∈G) (decision of a members Y in group G)

4. Leadership by Connectedness

As described in various embodiments above, certain types of leaders (such as Information Brokers, Relationship Brokers, and Resources Brokers) may be identified based on connectedness by network topology.

FIG. 8 illustrates an example of an Information Broker in a social network. As illustrated in FIG. 8, the actor Jane Doe has a very dense network that of highly integrated of people in Silicon Valley that know about "Consumer Big Data". Moreover, Jane Doe happens to have a weak tie to Sarah Young from Cisco. Sarah Young is heavily connected to the space of "Enterprise Big Data", which Jane Doe may not be familiar with. Accordingly, from the perspective of Jane Doe, Sarah Young is an Information Broker on the subject of "Enterprise Big Data" (even though Sarah Young may or may not be an Authority or reputation leader or this subject), because she is a gateway for Jane Doe to information on this subject that Jane Doe would otherwise not have access to.

4.1. Contextual Sociograph:

For a given leader type, there is a corresponding contextual sociograph.

For example, for an Information Authority, the corresponding Contextual sociograph captures all decision type T that are relevant to Decide (Concept(X, S), T|Y). See examples of T above.

For an Information Propagator, Information Trigger, and Information Broker, the corresponding contextual sociograph captures relationships that represent information flows between actors. Examples include connections (NUS feed on one's network activities), shared group affiliations, following relationships (e.g., following an influencer member, group, channel, company, institute, advertiser).

For a Relationship Authority, Relationship Propagator, Relationship Trigger, Relationship Broker, Resources Authority, Resources Propagator, Resources Trigger, and Resources Broker, the corresponding contextual sociograph captures relationships and the nature of relationships between actors. Examples include connections, shared affiliations, shared demographics or geographic information, named/unnamed roles (employer-employee, alumni-alumni, colleague-colleague, friend-friend), and so on.

4.2. Contextual Weight of Relationships:

According to various example embodiments, contextual weights for edges in a contextual sociograph that represent relationships between actors may be determined in accordance with a specific leadership type of interest. In some embodiments, the contextual weights may be assigned and are annotated by the system 1000 onto the sociograph.

For example, for a Propagator: An edge can represent a following relationship. The weight of the edge can be binary (follow or not); or numeric capturing the intensity/frequency/recency of flows (e.g., view, click, comment, like, reshare of articles by the leader) of an actor on the information from the leader.

For a Trigger: An edge can represent information relationship between Trigger and the actor. The weight can be based on the flows between them, such as flow types (e.g., comment, like on the leader's shares or discussion comments), intensity/frequency/recency of flow events.

For an Information Broker: An edge can represent information relationship between the leader and actor on a given topic. The weight of the edge can be numeric score capturing amount and quality (e.g., exclusivity, uniqueness, authoritativeness, comprehensiveness, oddity, timeliness, popularity, etc.) of information passed by the leader to the actor.

For a Relationship Broker: weights may reflect the depth of personal relationship as indicated by, for examples, number of years collaboration, closeness of roles with respect to them organization chart, nature of relationships, intensity, frequency, and recency of interactions between actors, degree of privacy (1-1/1-n/1-broadcast) of interactions between actors, and so on.

For a Resources Broker: weights may reflect potential access to resources as indicated by socio-economic advantages, Examples are seniority of roles, nature of roles (VCs can access resources more readily), affiliations (employed by category leaders enables access to employment opportunities).

4.3. Connectedness(X, Y, G2): Denotes the connectedness score of X to Y w.r.t. network G2 for a given leader type. It captures the degree of disconnectedness between Y and G2 if X were to be removed from the contextual sociograph.

For example, as illustrated in FIG. 8, Connectedness (Sarah Young, Jane Doe, Enterprise Big Data) may capture a high degree of disconnectedness between Jane Doe and the group Enterprise Big Data if Sarah Young were to be removed from the contextual sociograph in FIG. 8.

Disconnectedness can be intuited as, for example, reduced information flow if the leader type concerned is Information Broker.

4.4. Connectedness(X, Y, ALL): Denotes the connectedness of X to Y when we generalize G2 to the global population. For example, it captures reduced information exposure of Y to the global population if X is removed from the sociograph.

4.5. Connectedness(X, G1, G2): Denotes the connectedness score of X between sub-network G1 and sub-network G2 for a given leader type. It is based on Connectedness(X, Y, G2) for all Y in G1. (Generalize from an actor Y to a network G1).

5. Information Cascade/Diffusion Optimization

After leaders are identified, the system 1000 may utilize this information for the purposes of information diffusion optimization (e.g., whom to target within a community in order to maximize the adoption of an idea). For example, in some embodiments, by leveraging annotations about the leaders and other components of the sociograph, the system 1000 may understand the leadership types of individuals, information flow paths, and the topologies of a social network. In this way, the system 1000 may ultimately determine the best way to seed discussions and to effectively diffuse the information most relevant and useful to various users.

For example, in introducing a new idea in the form of an article, the system 1000 first identifies sub-networks relevant to the idea, such as sub-networks based on sociographs of personal relationships to the author or sharer, and/or sub-networks based on the sociographs of shared interests on the topic. The awareness of the idea may be first spread through Propagator. Next, the system 1000 targets Authority on the idea of a sub-network by surfacing the article to them and surfacing their activities to actors of the sub-network. As activities start to generate around the article, the system 1000 targets a Trigger (who may stimulate conversations around the article) and a Propagator (who further spreads the idea). At some point, the idea infects sufficient actors within the sub-network that the sub-network adopts the idea. The system 1000 also aims to spread the idea to adjacent sub-network w.r.t. a given contextual sociograph by surfacing activities of a Broker on the subject to another actor in an adjacent sub-network. The adoption cycle repeats in the new sub-network. In particular, if the subject is auxiliary to the core interests of the adjacent sub-network, the Broker delivers the value of exposing them to information they would otherwise not have known. The idea may then take on a viral path of adoption across the general network.

Consider the example of making connections on an online social network service, such as People You May Know (PYMK) recommendations on the LinkedIn®. For a new user, the system 1000 first identifies candidates the user may know. Among them, the system 1000 gives priority to Authority leaders (such as candidates with high socio-economic status), Trigger leaders (such as candidates who may message or interact with the user), Propagator leaders (such as candidates who are active networker with large network; through them the user may have access to a large 2nd degree circle), and so on. As the user starts to form sufficient connections around her core relationship types (e.g., as she settles into some sub-networks with a sense of belonging), the system 1000 introduces a Broker leader as window of opportunity to new types of relationships the user would otherwise not be connected with (such as weak ties who are bridge between sub-networks).

Examples of information diffusion techniques that may be executed by the system 1000 are illustrated with reference to FIG. 8. Suppose there is a post about Big Data to enterprise 2.0 from the actor Art Doe shared by a Propagator to a popular group, and suppose many people started commenting on it. The system 1000 may determine that Art Doe is a leader in the Big Data space (e.g., perhaps because many people are commenting on the article he posted). Accordingly, the system 1000 may surface that post (e.g., by making it appear higher) to other users in the densely connected group "Enterprise Big Data". The actor Sarah Young now has the opportunity to view it because she belongs to the same group "Enterprise Big Data", and thus she has the opportunity herself to surface that content and share it to her professional network outside of the group. Now, Sarah Young is an information Broker to Jane Doe, so the system 1000 may surface Sarah Young's interaction with the content to Jane Doe. As a result, Jane Doe now has access to information that she previously may not have even known existed. Jane Doe may then start to populate and share this information herself in the Consumer Big Data group. Moreover, the system 1000 may have determined prior that Charlie Jones is a reputation leader in the space of Consumer Big Data. So, when Charlie Jones comments on this post, his comment will be surfaced higher to other members in the Consumer Big Data group. In this way, information may be defused across sub-networks via both information connectors and reputation leaders.

5.1. Concepts: The system 1000 may optimize information cascade captured as concepts. Examples of a concept include news article, influence/member post, group discussion, comment to any of content above, company status.

5.2. Strategies: According to various example embodiments, a system may utilize various strategies to maximize information cascade based on the following:

5.2.1. Surface to sub-network(s) of relevance to the concept. For example, an article on Big Data is more relevant to actors & sub-networks with interest in Big Data w.r.t. the contextual sociograph on information flow. Another example is sub-networks around the author or actors interacting with the article w.r.t. contextual sociographs of personal relationships. Propagator can start the spread.

5.2.2. Surface information to—and surface the interactions of—reputation leaders on the concept to the sub-network, particularly at early stage of infection to the sub-network. Example, among comments made to the article in Big Data Group, surface comments by Authority, or Trigger leaders.

5.2.3. Across sub-networks, surface interactions by Broker leaders. For example, if Y is an information Broker to X, surface Y's interactions to X.

6. Use Cases:

6.1. Leadership Annotation:

According to various example embodiments, when an online social network service recommend leaders (such as recommending that a user should follow a leader or connect to a leader) or when the online social network service surfaces activities of leaders (such as the comments of the leader), the system 1000 annotate relevant attributes about the leaders so that users understand the underlying reasons.

For example, when a system surfaces a leader's (X's) interactions on some concept to a user Y (e.g., when X posts, likes, shares, etc., an article), the system 1000 may annotate the interaction with comments that indicate to Y the qualities and reasons of X's leadership (e.g., "Did you know that X is widely reputed to be an expert on Big Data by academics from ivy League schools?").

As another example, when a system recommends X to Y as a person to follow/connect to, the system 1000 may annotate the recommendation with comments that indicate to Y the qualities and reasons of X's leadership.

According to various example embodiments, when a system highlights X on a page, the system 1000 may annotate X with comments that indicate to Y the qualities and reasons of X's leadership. For example, a Channel leaderboard may include shortlist of curated VIPs, and Authority Trigger Propagator leaders may be identified based on their leadership scores. As another example, group can have a section that highlights leaders of the group.

The aforementioned example annotations may include various types of information. For example, for an Authority on a subject, the system 1000 may annotate the Authority's title or affiliations with recognized companies, institutions, and groups on that subject. As another example, for a Trigger, the system 1000 may annotate whether the Trigger has a group moderator role or group affiliation. As another example, for an Information Broker, the system 1000 may annotate the information Broker's affiliation with groups relevant to a concept. As another example, for a Relationship Broker, the system 1000 may annotate a number of connections of the Relationship Broker, homophily between the Relationship Broker and actor Y, etc. As another example, for a Resources Broker, the system 1000 may annotate the nature and seniority of a role of the Resources Broker, affiliations of the Resources Broker, etc. Each of the aforementioned annotations may be stored in a database in association with any of the sociographs described herein.

6.2. Information Cascade:

6.2.1. A given application has corresponding contextual sociograph. For example, for a content ecosystem location, a corresponding contextual sociograph is an information contextual sociograph. As another example, for a People You May Know application, the corresponding contextual sociograph is a relationship contextual sociograph. The system 1000 may recommend candidates to a user—such as following recommendations (content ecosystem), or connection (people you may know) recommendations by targeting leaders. For example, the system 1000 gives priority to an Authority, then a Propagator and a Trigger; as the user starts to settle into a sub-network, the system 1000 gives priority to a Broker to expose the user to an adjacent/new world.

6.2.2. According to various example embodiments, leadership types and scores may be factors utilized by a system to influence the rank order of information in content feeds, group conversations, a set of comments, and so on. For example, if the user is a reputation leader on a particular topic (as evidenced by a higher reputation leadership score), then an article that they posted may be ranked higher and/or displayed more prominently in a content feed, as opposed to an article posted by another actor that is not a reputation leader (or has a tower reputation leadership score). As another example, if the user is a reputation leader on a particular topic (as evidenced by a higher reputation leadership score), a comment that they posted may be ranked higher and/or displayed more prominently in a set of comments, as opposed to a comment posted by another actor that is not a reputation leader (or has a lower reputation leadership score). Examples of areas where such ranking may occur include LI Today content feeds on the LinkedIn Homepage, Channel Pages, Content Ecosystem Digest; network updates in the network update stream (NUS) stream, NUS Digest; group discussions in Groups, and so on.

6.2.3. According to various example embodiments, the contributions of different leader types may be more or less relevant in the context of different types of feeds or content spaces. For example, the system 1000 may rank the contributions of different types of leaders differently, depending on where these contributions may be displayed. For example, the contributions of Authority, Information Broker, and Propagator leaders may be more valuable to a content feed, and thus the system 1000 may display content published by these leaders more prominently in a content feed than content published by some other types of leaders (e.g., Triggers, Relationship Brokers, and resource brokers) or non-leaders. As another example, the contribution of Triggers may be more valuable in Group discussions, conversations, and comments to an article, and thus the system 1000 may display content published by a Trigger more prominently in a group discussion, conversation, and comments to articles, etc.

Figure 10:
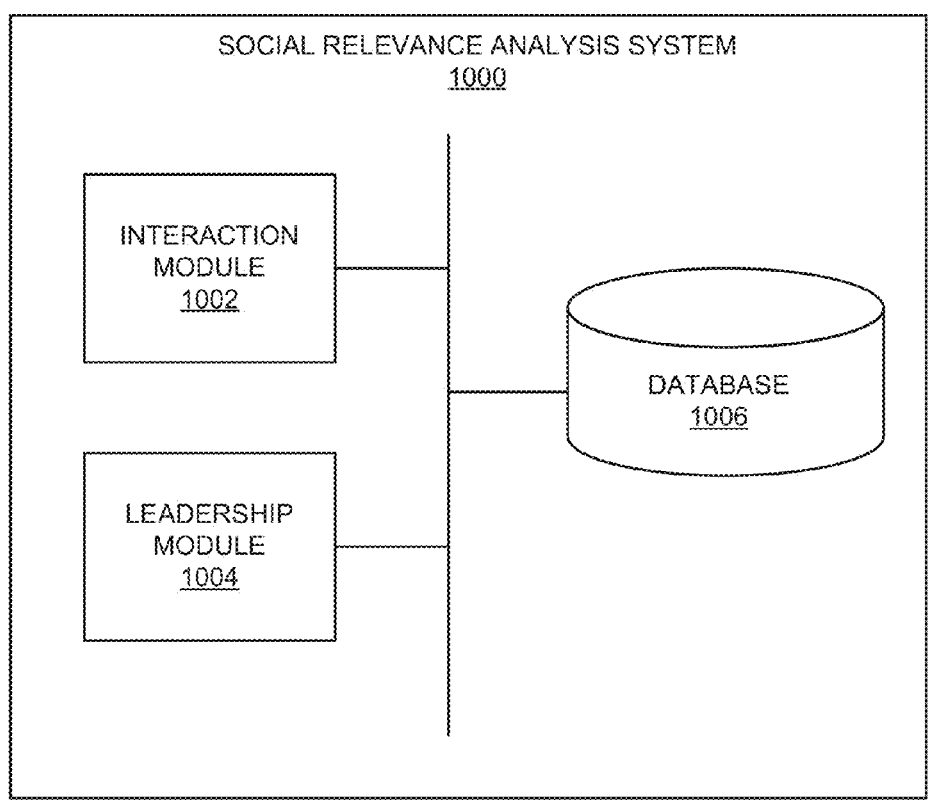
FIG. 10 is a block diagram of an example system, according to various embodiments.

Turning now to FIG. 10, a social relevance analysis system 1000 includes an interaction module 1002, a leadership module 1004, and a database 1006. The modules of the social relevance analysis system 1000 may be implemented on or executed by a single device such as a social relevance analysis device, or on separate devices interconnected via a network. The aforementioned social relevance analysis device may be, for example, a client machine or application server. Each of the modules of the social relevance analysis system 1000 will be described in more detail below.

Figure 11:
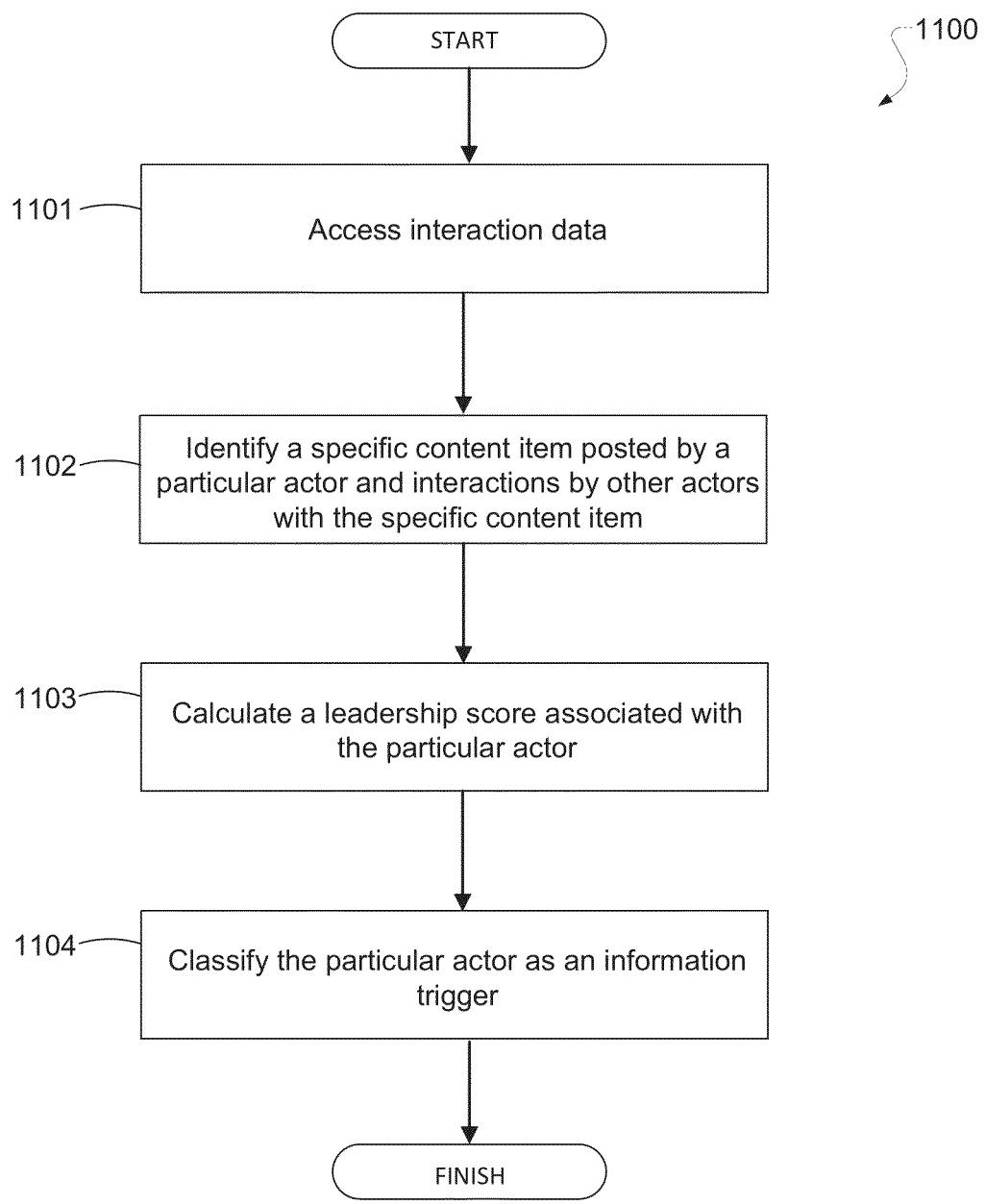
FIG. 11 is a flowchart illustrating an example method, according to various embodiments.

FIG. 11 is a flowchart illustrating an example method 1100, consistent with various embodiments described above. The method 1100 may be performed at least in part by, for example, the social relevance analysis system 1000 illustrated in FIG. 10 (or an apparatus having similar modules, such as a client machine or an application server). In operation 1101, the interaction module 1002 accesses interaction data describing interactions between a plurality of actors of the online social network service and one or more content items posted on the online social network service. The interaction data described herein may correspond to electronic data that describes how members of an online social network service interact with each other (e.g., posting information on another member's profile page, endorsing another member for skills, posting recommendation on another member's profile page, etc.), and/or electronic data describing how members interact with the various products of the online social network service (e.g., how members interact with content in a content feed such as articles or media content, such as by viewing, clicking, liking, sharing, following, commenting, etc., or how members interact with products such as group pages, company pages, University pages, etc.). In some embodiments, the interaction data may correspond to the data stored in the database 32 illustrated in FIG. 1. In operation 1102, the interaction module 1002 identifies, based on the interaction data, a specific content item posted by a particular actor and interactions by other actors with the specific content item. In some embodiments, the specific content item may be an article, a message, a comment, a question, a statement, a status update, or media content.

In operation 1103 in FIG. 11, the leadership module 1004 calculates, based on the interaction data, a leadership score associated with the particular actor, the leadership score indicating a propensity of the particular actor to stimulate discussion among actors of the online social network service. In some embodiments, the leadership score may correspond to a number (e.g., a number in a predefined range, such as 0 to 1, or 1 to 10, or 1 to 100, etc.). In some embodiments, the leadership module 1004 may calculate the leadership score by determining a number of comments that the specific content item posted by the particular actor has received within a predefined period of time after being posted. In some embodiments, the leadership module 1004 may calculate the leadership score by determining that the specific content item posted by the particular actor corresponds to provocative or unconventional content. In some embodiments, the leadership module 1004 may calculate the leadership score by determining a number of actors of the online social network service that have interacted with the specific content item posted by the particular actor, the interacting corresponding to viewing, clicking, liking, sharing, following, or commenting on the specific content item posted by the particular actor.

In operation 1104 in FIG. 11, the leadership module 1004 classifies the particular actor as an information trigger among the plurality of actors of the online social network service, based on the calculated leadership score. For example, the leadership module 1004 may compare the calculated leadership score to a predefined threshold. In some embodiments, if the calculated leadership score is greater than or equal to the predetermined threshold, then the leadership module 1004 may classify the first actor as an information propagator on the particular topic, whereas if the calculated leadership score is less than the predetermined threshold, then the leadership module 1004 will not classify the first actor as an information propagator on the particular topic. It is contemplated that the operations of method 1100 may incorporate any of the other features disclosed herein. Various operations in the method 1100 may be omitted or rearranged, as necessary.

Figure 12:
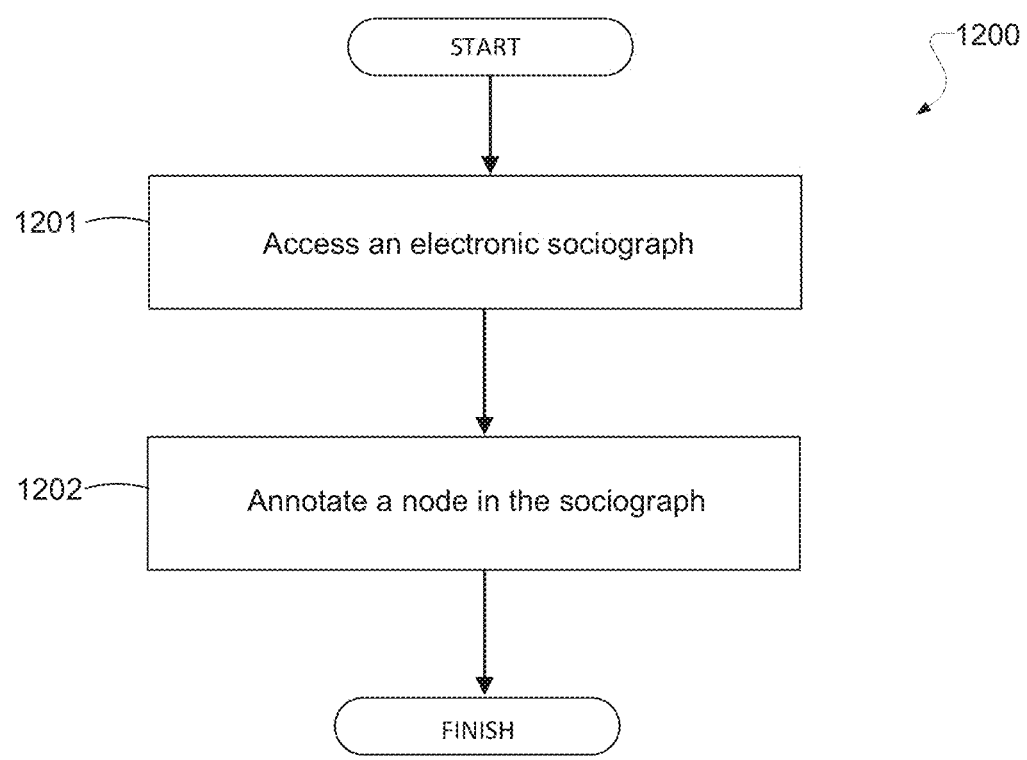
FIG. 12 is a flowchart illustrating an example method, according to various embodiments.

FIG. 12 is a flowchart illustrating an example method 1200, consistent with various embodiments described above. In some embodiments, the method 1200 may occur after the method 1100 in FIG. 11 (e.g., after it is determined that a particular actor is an information trigger). The method 1200 may be performed at least in part by, for example, the social relevance analysis system 1000 illustrated in FIG. 10 (or an apparatus having similar modules, such as a client machine or an application server). In operation 1201, the leadership module 1004 accesses an electronic sociograph depicting the plurality of actors of the online social network service as nodes in the sociograph, the sociograph including edges extending between the nodes that represent relationships between the respective actors. The sociographs described herein may be stored in electronic form (e.g., in the database 30 illustrated in FIG. 1 or the database 1006 illustrated in FIG. 10). In operation 1202, the leadership module 1004 annotates a node in the sociograph corresponding to the particular actor with information indicating that the particular actor is classified as an information trigger. It is contemplated that the operations of method 1200 may incorporate any of the other features disclosed herein. Various operations in the method 1200 may be omitted or rearranged, as necessary.

Figure 13:
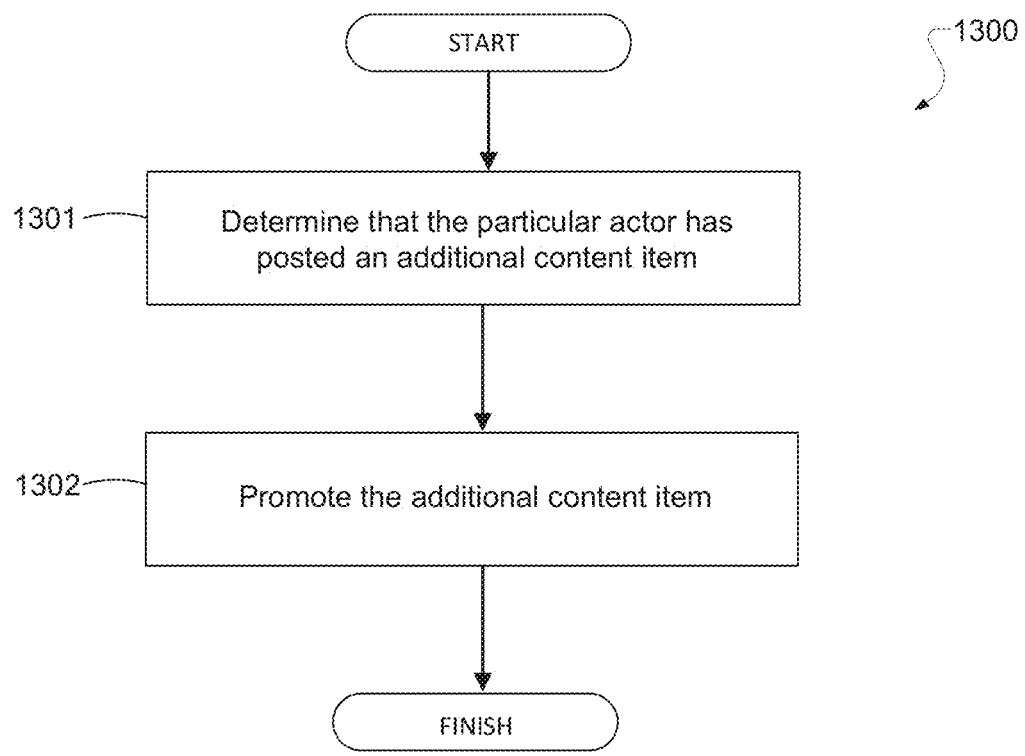
FIG. 13 is a flowchart illustrating an example method, according to various embodiments.

FIG. 13 is a flowchart illustrating an example method 1300, consistent with various embodiments described above. In some embodiments, the method 1300 may occur after the method 1100 in FIG. 11 (e.g., after it is determined that a particular actor is an information trigger). The method 1300 may be performed at least in part by, for example, the social relevance analysis system 1000 illustrated in FIG. 10 (or an apparatus having similar modules, such as a client machine or an application server). In operation 1301, the leadership module 1004 determines that the particular actor has posted an additional content item on the online social network service, the content item corresponding to an article or a comment. In operation 1302, the leadership module 1004 promotes the additional content item in a content feed or a list of comments associated with the online social network service. For example, the leadership module 1004 places the content item higher and/or more prominently in the content feed or the list of comments than it otherwise would appear. It is contemplated that the operations of method 1300 may incorporate any of the other features disclosed herein. Various operations in the method 1300 may be omitted or rearranged, as necessary.

Figure 14:
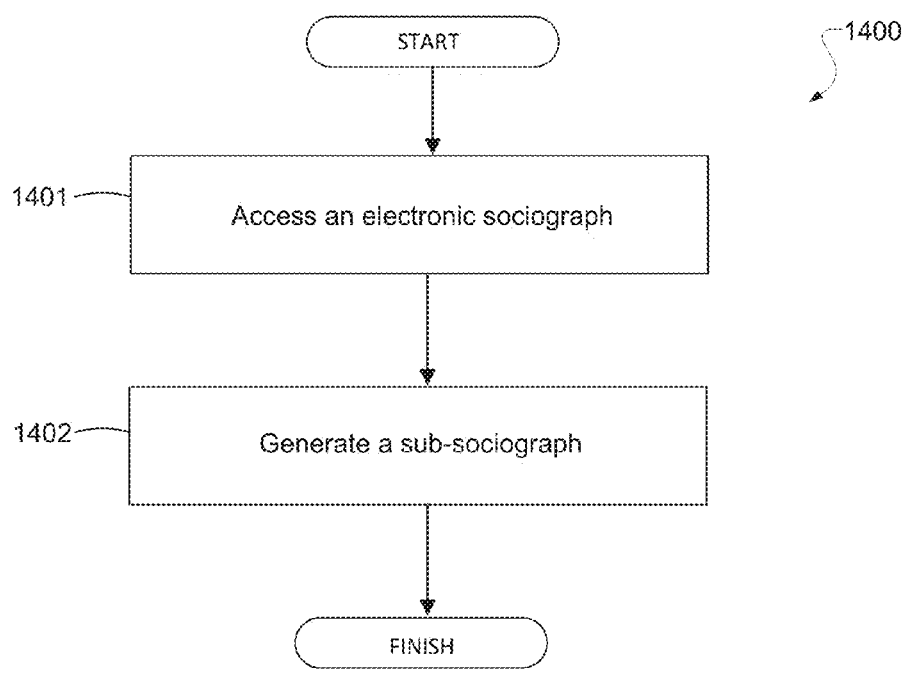
FIG. 14 is a flowchart illustrating an example method, according to various embodiments.

FIG. 14 is a flowchart illustrating an example method 1400, consistent with various embodiments described above. The method 1400 may be performed at least in part by, for example, the social relevance analysis system 1000 illustrated in FIG. 10 (or an apparatus having similar modules, such as a client machine or an application server). In some embodiments, the method 1400 may be performed by the social relevance analysis system 1000 in order to identify an information trigger. In operation 1401, the leadership module 1004 accesses an electronic sociograph depicting the plurality of actors of the online social network service as nodes in the sociograph, the sociograph including edges extending between the nodes that represent relationships between the respective actors. The sociographs described herein may be stored in electronic form (e.g., in the database 30 illustrated in FIG. 1 or in the database 1006 illustrated in FIG. 10). In operation 1402, the leadership module 1004 generates a sub-sociograph based on the sociograph, where the sub-sociograph contains a reduced set of information relevant to the identification of an information trigger. For example, the sub-sociograph may include annotated flows between nodes representing the interactions by the other actors with content item posted by a particular actor, the interacting corresponding to viewing, clicking, liking, sharing, following, or commenting on the specific content item posted by the particular actor. In some embodiments, profile data and relationship data associated with the plurality of actors of the online social network service are omitted from the sub-sociograph, since this is less relevant to the identification of information trigger. It is contemplated that the operations of method 1400 may incorporate any of the other features disclosed herein. Various operations in the method 1400 may be omitted or rearranged, as necessary.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 15:
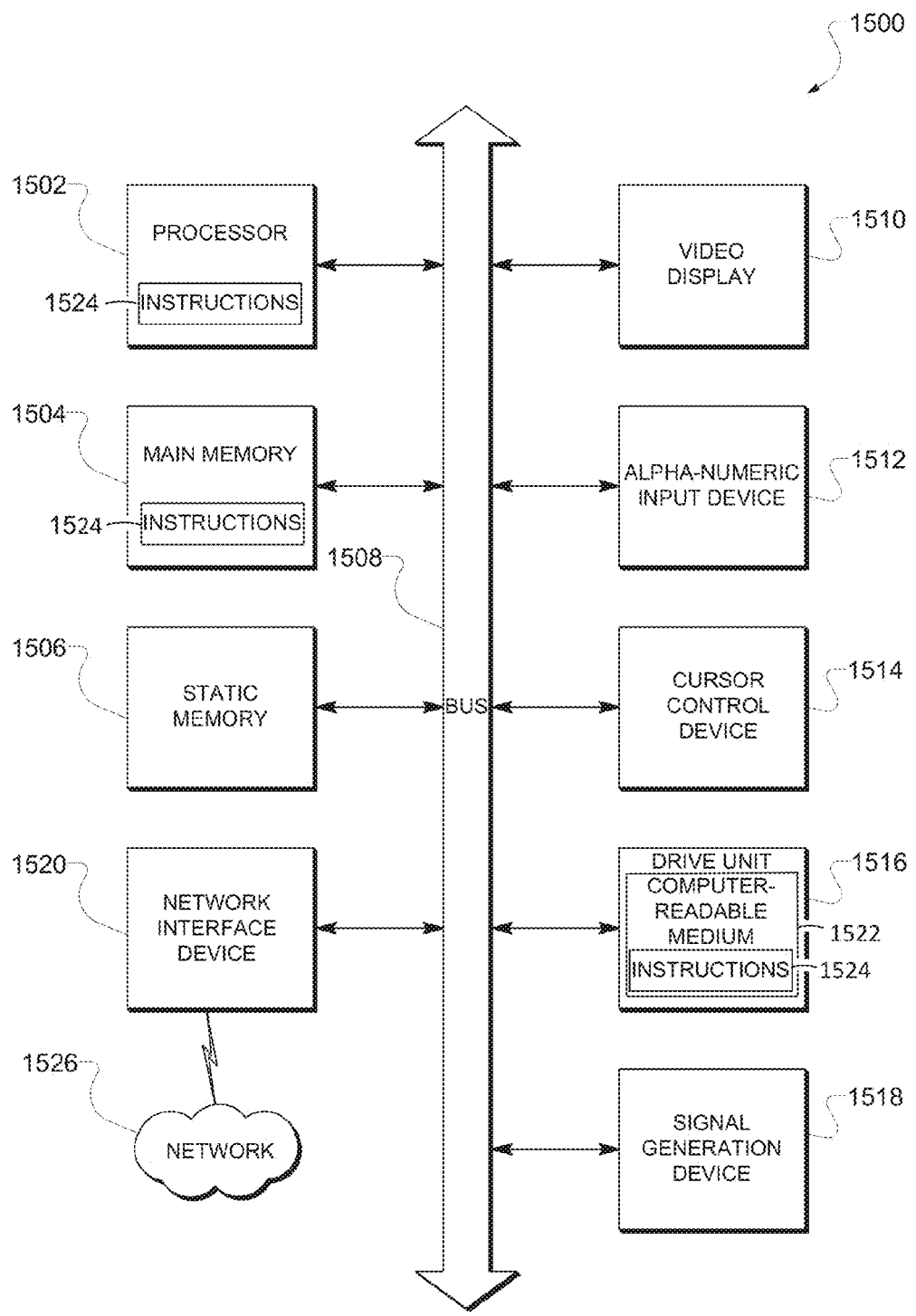
FIG. 15 is a diagrammatic representation of a machine in the example form of a computer system within which a set of instructions, for causing the machine to perform any one or more of the methodologies discussed herein, may be executed.

FIG. 15 is a block diagram of machine in the example form of a computer system 1500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard or a touch-sensitive display screen), a user interface (UIf) navigation device 1514 (e.g., a mouse), a disk drive unit 1516, a signal generation device 1518 (e.g., a speaker) and a network interface device 1520.

Machine-Readable Medium

The disk drive unit 1516 includes a machine-readable medium 1522 on which is stored one or more sets of instructions and data structures (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1524 may further be transmitted or received over a communications network 1526 using a transmission medium. The instructions 1524 may be transmitted using the network interface device 1520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing interaction data describing interactions between a plurality of actors of the online social network service and one or more content items posted on the online social network service;
   identifying, based on the interaction data, a specific content item posted by a particular actor of the plurality of actors and interactions by other actors of the plurality of actors with the specific content item, wherein identifying the specific content item comprises:
      accessing an electronic sociograph depicting one or more actors from the plurality of actors as a respective node in the electronic sociograph, the electronic sociograph including at least one edge extending between a respective node pair, wherein an edge represents a relationship between respective other actors that correspond with the given node pair; and
      generating a sub-sociograph based on the electronic sociograph, the sub-sociograph including at least one annotated flow between the respective node pair, wherein an annotated flow represents one or more interactions with the specific content item by at least one of the respective other actors, wherein a respective instance of an interaction comprises one of: viewing, clicking, liking, sharing, following, or commenting on the specific content item;
   calculating, by a machine including a memory and at least one processor and based on the interaction data, a leadership score associated with the particular actor, the leadership score indicating a propensity of the particular actor to stimulate discussion among actors of the online social network service; and
   classifying the particular actor as an information trigger among the plurality of actors of the online social network service, based on the calculated leadership score.

2. The method of claim 1, wherein the calculating further comprises:
   determining a number of comments that the specific content item posted by the particular actor has received within a predefined period of time after being posted.

3. The method of claim 1, wherein the calculating further comprises:
   determining that the specific content item posted by the particular actor corresponds to provocative or unconventional content.

4. The method of claim 1, wherein the calculating further comprises:
   determining a number of instances of interactions by respective actors of the online social network service with the specific content item.

5. The method of claim 1, wherein the specific content item posted by the particular actor is at least one of an article, a message, a comment, a question, a statement, a status update, or media content.

6. The method of claim 1, further comprising:
annotating a particular node, in the electronic sociography, corresponding to the particular actor to indicate the particular actor is classified as the information trigger.

7. The method of claim 1 wherein profile data and relationship data associated with at least one of the plurality of actors of the online social network service are omitted from the sub-sociograph.

8. The method of claim 1, further comprising:
determining that the particular actor has posted an additional content item on the online social network service, the additional content item corresponding to an article or a comment; and
promoting, due to the particular actor's classification as the information trigger, the additional content item in a content feed or a list of comments associated with the online social network service.

9. The method of claim 1, wherein the particular actor is one of a:
a member of the online social network service; and
an entity of the online social network service, wherein the entity corresponds to at least one of a company entity, a group entity, and an educational entity associated with the online social network service.

10. A system comprising:
a machine including a memory and at least one processor;
a interaction module configured to:
access interaction data describing interactions between a plurality of actors of the online social network service and one or more content items posted on the online social network service; and
identify, based on the interaction data, a specific content item posted by a particular actor of the plurality of actors and interactions by other actors of the plurality of actors with the specific content item, which comprises the interaction module further configured to
access an electronic sociograph depicting one or more actors from the plurality of actors as a respective node in the electronic sociograph, the electronic sociograph including at least one edge extending between a respective node pair, wherein an edge represents a relationship between respective other actors that correspond with the given node pair; and
generate a sub-sociograph based on the electronic sociograph, the sub-sociograph including at least one annotated flow between the respective node pair, wherein an annotated flow represents one or more interactions with the specific content item by at least one of the respective other actors, wherein a respective instance of an interaction comprises one of: viewing, clicking, liking, sharing, following, or commenting on the specific content item; and a leadership module, executable by the machine, configured to:
calculate, based on the interaction data, a leadership score associated with the particular actor, the leadership score indicating a propensity of the particular actor to stimulate discussion among actors of the online social network service; and
classify the particular actor as an information trigger among the plurality of actors of the online social network service, based on the calculated leadership score.

11. The system of claim 10, wherein the leadership module is further configured to:
determine a number of comments that the specific content item posted by the particular actor has received within a predefined period of time after being posted.

12. The system of claim 10, wherein the leadership module is further configured to:
determine that the specific content item posted by the particular actor corresponds to provocative or unconventional content.

13. The system of claim 10, wherein the leadership module is further configured to:
determine a number of instances of interactions by respective actors of the online social network service with the specific content item.

14. The system of claim 10, wherein the specific content item posted by the particular actor is at least one of an article, a message, a comment, a question, a statement, a status update, or media content.

15. A non-transitory machine-readable storage medium comprising instructions that, when executed by one or more processors of a machine, cause the machine to perform operations comprising:
accessing interaction data describing interactions between a plurality of actors of the online social network service and one or more content items posted on the online social network service;
identifying, based on the interaction data, a specific content item posted by a particular actor of the plurality of actors and interactions by other actors of the plurality of actors with the specific content item, wherein identifying the specific content item comprises:
accessing an electronic sociograph depicting one or more actors from the plurality of actors as a respective node in the electronic sociograph, the electronic sociograph including at least one edge extending between a respective node pair, wherein an edge represents a relationship between respective other actors that correspond with the given node pair; and
generating a sub-sociograph based on the electronic sociograph, the sub-sociograph including at least one annotated flow between the respective node pair, wherein an annotated flow represents one or more interactions with the specific content item by at least one of the respective other actors, wherein a respective instance of an interaction comprises one of: viewing, clicking, liking, sharing, following, or commenting on the specific content item;
calculating, based on the interaction data, a leadership score associated with the particular actor, the leadership score indicating a propensity of the particular actor to stimulate discussion among actors of the online social network service; and
classifying the particular actor as an information trigger among the plurality of actors of the online social network service, based on the calculated leadership score.

16. The storage medium of claim 15, wherein the calculating further comprises:
determining a number of comments that the specific content item posted by the particular actor has received within a predefined period of time after being posted.

17. The storage medium of claim 15, wherein the calculating further comprises:
determining that the specific content item posted by the particular actor corresponds to provocative or unconventional content.

18. The storage medium of claim 15, wherein the calculating further comprises:
   determining a number of instances of interactions by respective actors of the online social network service with the specific content item.

* * * * *

UNITED STATES PATENT AND TRADEMARK OFFICE
CERTIFICATE OF CORRECTION

PATENT NO. : 9,547,877 B2
APPLICATION NO. : 14/298793
DATED : January 17, 2017
INVENTOR(S) : Chung et al.

Page 1 of 1

It is certified that error appears in the above-identified patent and that said Letters Patent is hereby corrected as shown below:

In Column 35, Line 7, in Claim 7, delete "claim 1" and insert --claim 1,-- therefor In Column 35, Line 21, in Claim 9, delete "a:" and insert --:-- therefor In Column 35, Line 38, in Claim 10, delete "to" and insert --to:-- therefor Signed and Sealed this
Tenth Day of April, 2018

Andrei Iancu
*Director of the United States Patent and Trademark Office*